(12) United States Patent
Wang et al.

(10) Patent No.: US 12,439,401 B2
(45) Date of Patent: Oct. 7, 2025

(54) SIDELINK UNIFIED TRANSMISSION CONFIGURATION INDICATOR STATE

(71) Applicant: QUALCOMM Incorporated, San Diego, CA (US)

(72) Inventors: Hua Wang, Basking Ridge, NJ (US); Sony Akkarakaran, Poway, CA (US); Yan Zhou, San Diego, CA (US); Tianyang Bai, Somerville, NJ (US); Jung Ho Ryu, Fort Lee, NJ (US); Jing Sun, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/932,061

(22) Filed: Sep. 14, 2022

(65) Prior Publication Data

US 2024/0089950 A1 Mar. 14, 2024

(51) Int. Cl.
*H04W 72/12* (2023.01)
*H04L 5/00* (2006.01)
*H04W 72/1263* (2023.01)
*H04W 80/02* (2009.01)
*H04W 92/18* (2009.01)

(52) U.S. Cl.
CPC ....... *H04W 72/1263* (2013.01); *H04L 5/0053* (2013.01); *H04W 80/02* (2013.01); *H04W 92/18* (2013.01)

(58) Field of Classification Search
CPC ... H04W 28/04; H04W 72/04; H04W 72/042; H04W 88/08; H04W 72/1263; H04W 80/02; H04L 5/0007; H04L 5/0053

USPC .......................................................... 370/329
See application file for complete search history.

(56) References Cited

U.S. PATENT DOCUMENTS

| | | | |
|---|---|---|---|
| 11,785,632 B2 * | 10/2023 | Kim ...................... | H04L 5/0091 370/329 |
| 2021/0143964 A1 * | 5/2021 | Frenne .................. | H04L 5/0053 |
| 2021/0195616 A1 * | 6/2021 | Venugopal ............ | H04W 72/23 |

(Continued)

FOREIGN PATENT DOCUMENTS

| | | | | |
|---|---|---|---|---|
| EP | 3 846 368 A1 * | 7/2021 | ............... | H04L 1/16 |
| EP | 3 883 320 A1 * | 9/2021 | ............ | H04W 72/04 |

(Continued)

OTHER PUBLICATIONS

International Search Report and Written Opinion—PCT/US2023/072635—ISA/EPO—Dec. 13, 2023.

*Primary Examiner* — Peter G Solinsky
*Assistant Examiner* — Sanjay K Dewan
(74) *Attorney, Agent, or Firm* — Harrity & Harrity, LLP

(57) ABSTRACT

Various aspects of the present disclosure generally relate to wireless communication. In some aspects, a first user equipment (UE) may transmit, to a second UE, an indication of at least one sidelink unified transmission configuration indicator (TCI) state, wherein the at least one sidelink unified TCI state includes at least one of: a joint forward link and reverse link TCI state, a separate forward link TCI state, or a separate reverse link TCI state. The first UE may communicate with the second UE on at least one of the forward link or the reverse link based at least in part on the indication of the sidelink unified TCI state. Numerous other aspects are described.

30 Claims, 18 Drawing Sheets

(56) References Cited

U.S. PATENT DOCUMENTS

| | | | |
|---|---|---|---|
| 2021/0385803 A1* | 12/2021 | Shi | H04B 7/02 |
| 2022/0070848 A1* | 3/2022 | Liu | H04B 7/0695 |
| 2022/0116914 A1* | 4/2022 | Yang | H04W 72/044 |
| 2022/0140951 A1* | 5/2022 | He | H04L 5/0055 |
| | | | 370/329 |
| 2022/0159583 A1* | 5/2022 | Wang | H04W 52/242 |
| 2022/0408458 A1* | 12/2022 | MolavianJazi | H04W 72/0453 |
| 2023/0106128 A1* | 4/2023 | Lee | H04W 72/569 |
| | | | 370/329 |
| 2023/0123886 A1* | 4/2023 | Wang | H04L 5/0023 |
| | | | 370/329 |
| 2023/0164782 A1* | 5/2023 | Kim | H04W 72/23 |
| | | | 370/329 |
| 2024/0224302 A1* | 7/2024 | Li | H04L 5/0094 |
| 2024/0314697 A1* | 9/2024 | Wang | H04W 52/383 |
| 2024/0340108 A1* | 10/2024 | Zorgui | H04L 1/08 |

FOREIGN PATENT DOCUMENTS

| | | | | |
|---|---|---|---|---|
| WO | WO 2020/146377 A1 * | 7/2020 | | H04L 5/00 |
| WO | WO 2020/211951 A1 * | 10/2020 | | H04W 72/12 |
| WO | WO 2021/091302 A1 * | 5/2021 | | H04W 76/18 |
| WO | WO 2024/209386 A1 * | 10/2024 | | H04L 5/00 |

* cited by examiner

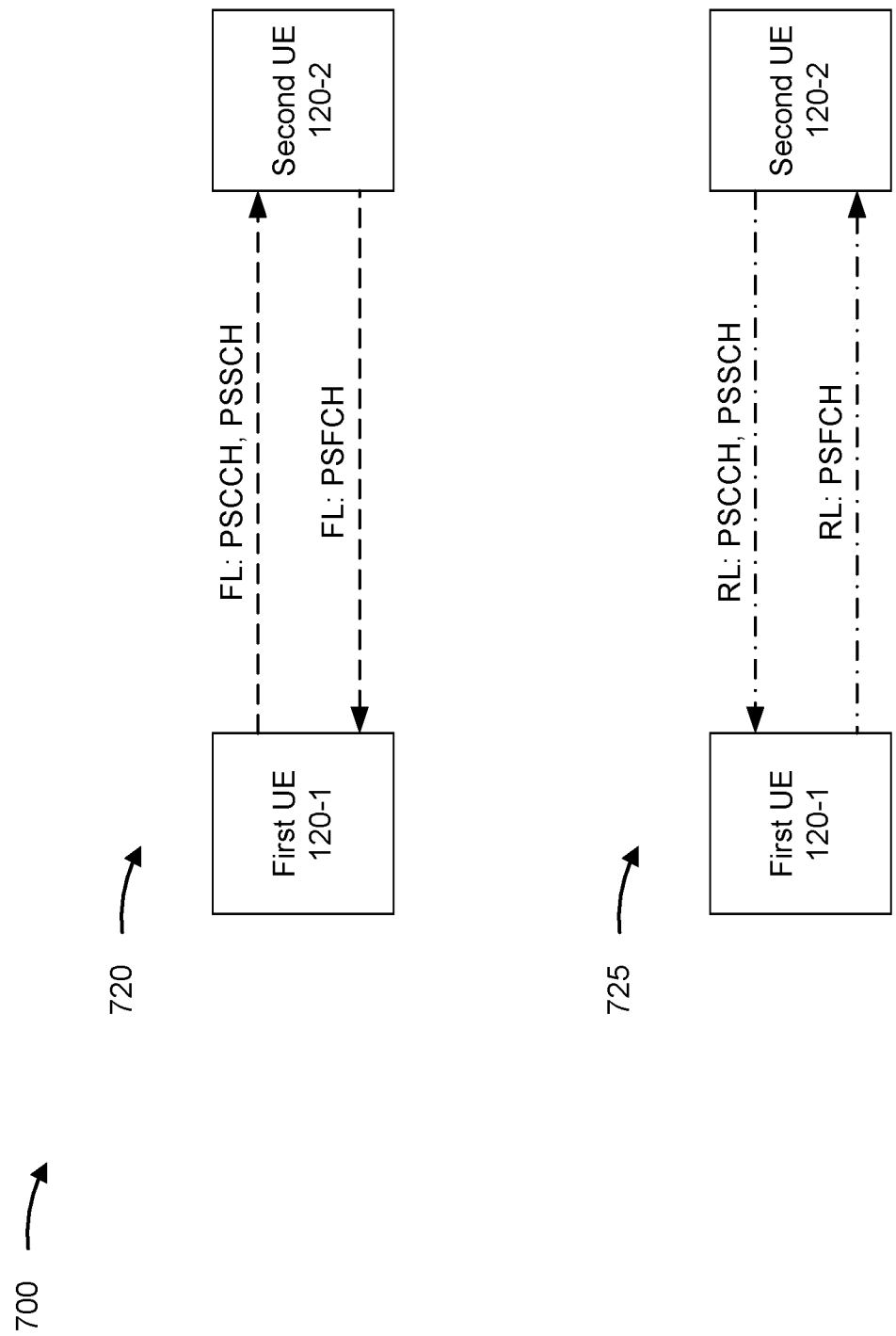

SIDELINK UNIFIED TRANSMISSION CONFIGURATION INDICATOR STATE

FIELD OF THE DISCLOSURE

Aspects of the present disclosure generally relate to wireless communication and to techniques and apparatuses for applying a sidelink unified transmission configuration indicator (TCI) state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first user equipment (UE) for wireless communication. The first UE may include a memory and one or more processors coupled to the memory. The one or more processors may be configured to transmit, to a second UE, an indication of at least one sidelink unified transmission configuration indicator (TCI) state, wherein the at least one sidelink unified TCI state includes at least one of. The one or more processors may be configured to communicate with the second UE on at least one of the forward link or the reverse link based at least in part on the indication of the sidelink unified TCI state.

Some aspects described herein relate to a second UE for wireless communication. The second UE may include a memory and one or more processors coupled to the memory. The one or more processors may be configured to receive, from a first UE, an indication of at least one sidelink unified TCI state, wherein the at least one sidelink unified TCI state includes at least one of. The one or more processors may be configured to communicate with the first UE on at least one of the forward link or the reverse link based at least in part on the indication of the sidelink unified TCI state.

Some aspects described herein relate to a method of wireless communication performed by a first UE. The method may include transmitting, to a second UE, an indication of at least one sidelink unified TCI state, wherein the at least one sidelink unified TCI state includes at least one of, a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link. The method may include communicating with the second UE on at least one of the forward link or the reverse link based at least in part on the indication of the sidelink unified TCI state.

Some aspects described herein relate to a method of wireless communication performed by a second UE. The method may include receiving, from a first UE, an indication of at least one sidelink unified TCI state, wherein the at least one sidelink unified TCI state includes at least one of, a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link. The method may include communicating with the first UE on at least one of the forward link or the reverse link based at least in part on the indication of the sidelink unified TCI state.

Some aspects described herein relate to a non-transitory computer-readable medium that stores a set of instructions for wireless communication by a first UE. The set of instructions, when executed by one or more processors of the UE, may cause the UE to transmit, to a second UE, an indication of at least one sidelink unified TCI state, wherein the at least one sidelink unified TCI state includes at least one of. The set of instructions, when executed by one or more processors of the UE, may cause the UE to communicate with the second UE on at least one of the forward link or the reverse link based at least in part on the indication of the sidelink unified TCI state.

Some aspects described herein relate to a non-transitory computer-readable medium that stores a set of instructions for wireless communication by a second UE. The set of instructions, when executed by one or more processors of the UE, may cause the UE to receive, from a first UE, an indication of at least one sidelink unified TCI state, wherein the at least one sidelink unified TCI state includes at least one of. The set of instructions, when executed by one or more processors of the UE, may cause the UE to communicate with the first UE on at least one of the forward link or the reverse link based at least in part on the indication of the sidelink unified TCI state.

Some aspects described herein relate to an apparatus for wireless communication. The apparatus may include means for transmitting, to a UE, an indication of at least one sidelink unified TCI state, wherein the at least one sidelink unified TCI state includes at least one of, a joint forward link and reverse link TCI state applicable to a plurality of sidelink channels on a forward link between the apparatus and the UE and a plurality of sidelink channels on a reverse link between the apparatus and the UE, a separate forward link TCI state applicable to the plurality of sidelink channels on the forward link, or a separate reverse link TCI state applicable to the plurality of sidelink channels on the reverse link. The apparatus may include means for communicating with the UE on at least one of the forward link or the reverse link based at least in part on the indication of the sidelink unified TCI state.

Some aspects described herein relate to an apparatus for wireless communication. The apparatus may include means for receiving, from a UE, an indication of at least one sidelink unified TCI state, wherein the at least one sidelink unified TCI state includes at least one of, a joint forward link and reverse link TCI state applicable to a plurality of sidelink channels on a forward link between the UE and the apparatus and a plurality of sidelink channels on a reverse link between the UE and the apparatus, a separate forward link TCI state applicable to the plurality of sidelink channels on the forward link, or a separate reverse link TCI state applicable to the plurality of sidelink channels on the reverse link. The apparatus may include means for communicating with the UE on at least one of the forward link or the reverse link based at least in part on the indication of the sidelink unified TCI state.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7D and 8A-8E are diagrams illustrating examples associated with applying a sidelink unified TCI state, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
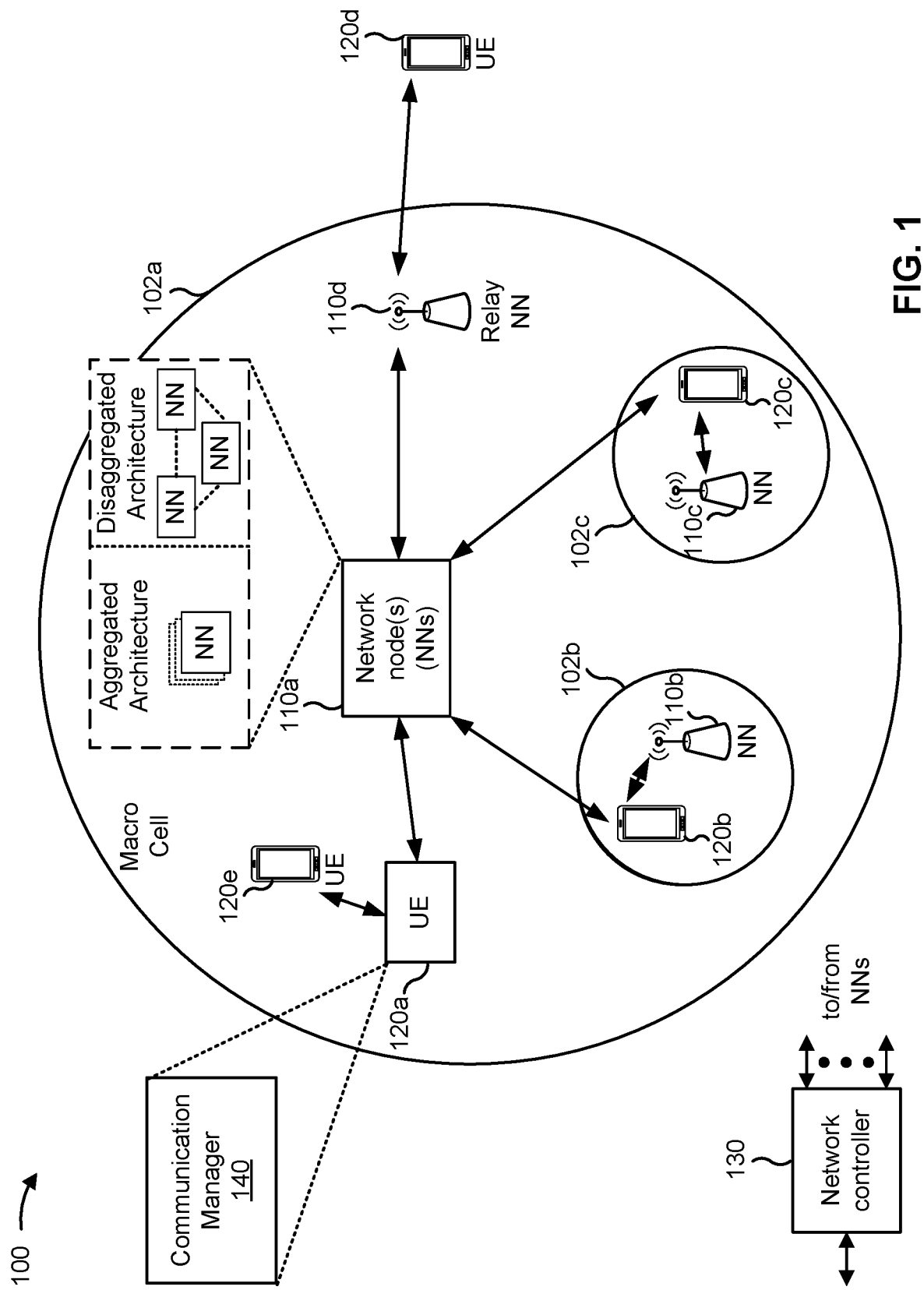
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to another UE, an indication of at least one sidelink unified transmission configuration indicator (TCI) state, wherein the at least one sidelink unified TCI state includes at least one of a joint forward link and reverse link TCI state applicable to a plurality of sidelink channels on a forward link between the UE and the other UE and a plurality of sidelink channels on a reverse link between the first and the other UE, a separate forward link TCI state applicable to the plurality of sidelink channels on the forward link, or a separate reverse link TCI state applicable to the plurality of sidelink channels on the reverse link; and communicate with the other UE on at least one of the forward link or the reverse link based at least in part on the indication of the sidelink unified TCI state. Additionally, or alternatively, the communication manager 140 may perform one or more other operations described herein.

In some aspects, as described in more detail elsewhere herein, the communication manager 140 may receive, from another UE, an indication of at least one sidelink unified TCI state, wherein the at least one sidelink unified TCI state includes at least one of a joint forward link and reverse link TCI state applicable to a plurality of sidelink channels on a forward link between the other UE and the UE and a plurality of sidelink channels on a reverse link between the other UE and the UE, a separate forward link TCI state applicable to the plurality of sidelink channels on the forward link, or a separate reverse link TCI state applicable to the plurality of sidelink channels on the reverse link; and communicate with the other UE on at least one of the forward link or the reverse link based at least in part on the indication of the sidelink unified TCI state. Additionally, or alternatively, the communication manager 140 may perform one or more other operations described herein.

As indicated above, FIG. 1 is provided as an example. Other examples may differ from what is described with regard to FIG. 1.

Figure 2:
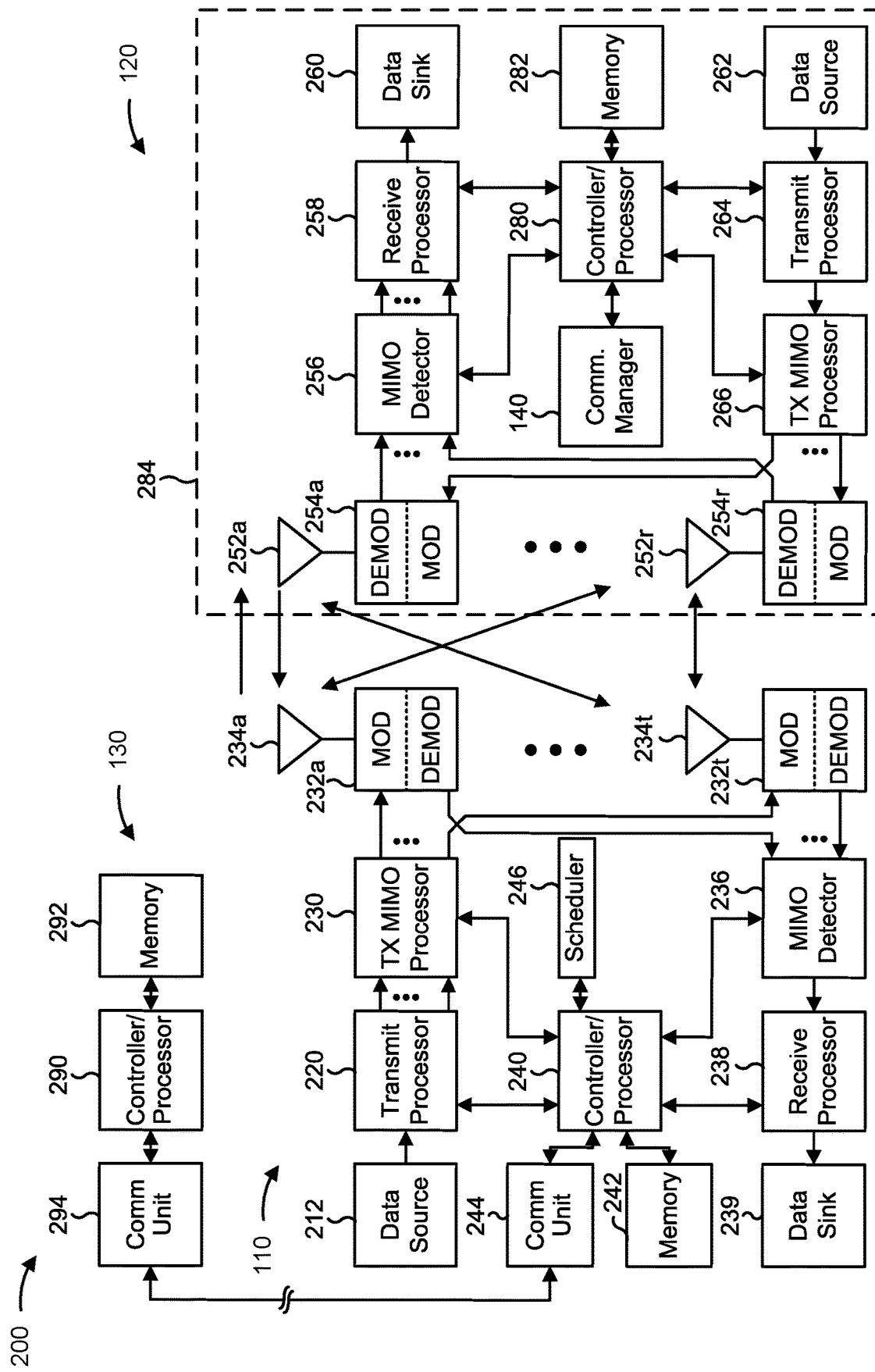
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-7D, 8A-8E, and 9-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-7D, 8A-8E, and 9-11).

The controller/processor 240 of the network node 110, the controller/processor 280 of the UE 120, and/or any other component(s) of FIG. 2 may perform one or more techniques associated with applying a sidelink unified TCI state, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a first UE (e.g., the UE 120) includes means for transmitting, to a second UE, an indication of at least one sidelink unified TCI state, wherein the at least one sidelink unified TCI state includes at least one of a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link; and/or means for communicating with the second UE on at least one of the forward link or the reverse link based at least in part on the indication of the sidelink unified TCI state. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., the UE 120) includes means for receiving, from a first UE, an indication of at least one sidelink unified TCI state, wherein the at least one sidelink unified TCI state includes at least one of a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link; and/or means for communicating with the first UE on at least one of the forward link or the reverse link based at least in part on the indication of the sidelink unified TCI state. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
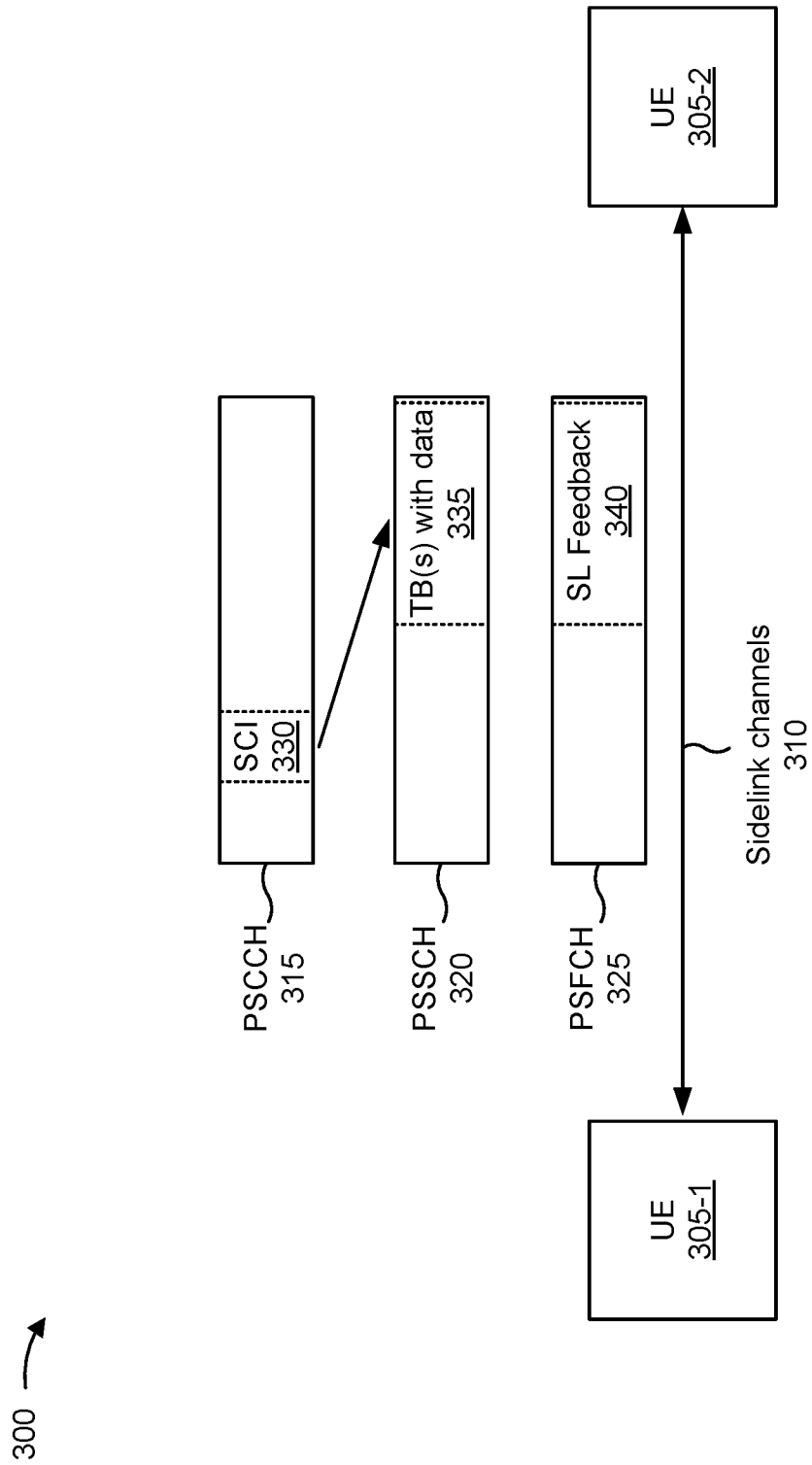
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement (ACK) or negative acknowledgement (NACK) (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process identifier (ID), a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink resource allocation mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a resource allocation mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
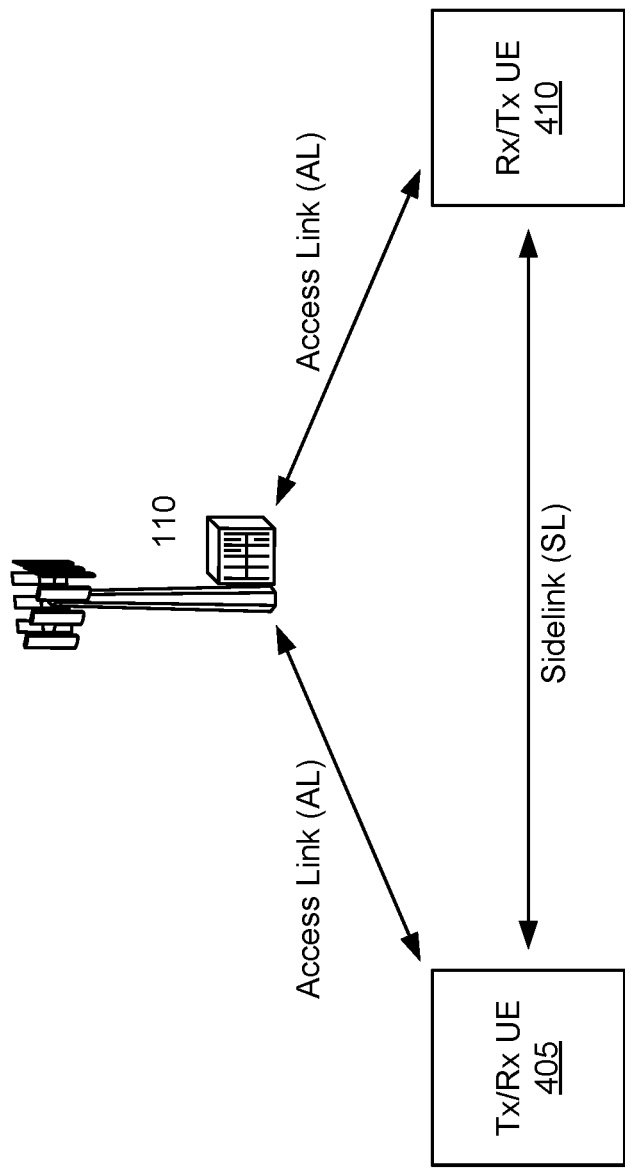
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a first access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5:
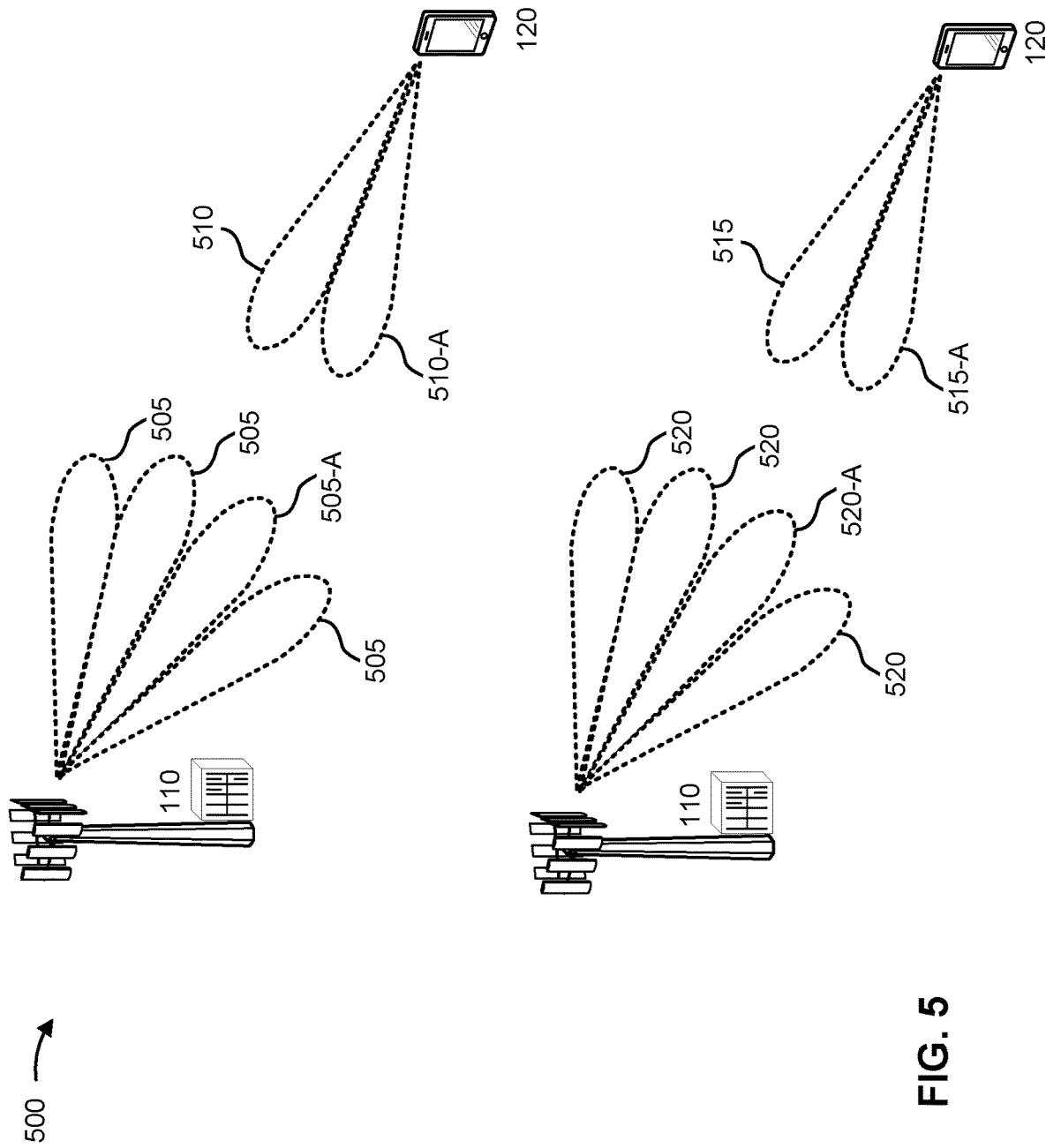
FIG. 5 is a diagram illustrating an example of using beams for communications between a network node and a UE, in accordance with the present disclosure.

FIG. 5 is a diagram illustrating an example 500 of using beams for communications between a network node and a UE, in accordance with the present disclosure. As shown in FIG. 5, a network node 110 and a UE 120 may communicate with one another.

The network node 110 may transmit to UEs 120 located within a coverage area of the network node 110. The network node 110 and the UE 120 may be configured for beamformed communications, where the network node 110 may transmit in the direction of the UE 120 using a directional network node (NN) transmit beam (e.g., a base station (BS) transmit beam), and the UE 120 may receive the transmission using a directional UE receive beam. Each NN transmit beam may have an associated beam ID, beam direction, or beam symbols, among other examples. The network node 110 may transmit downlink communications via one or more NN transmit beams 505.

The UE 120 may attempt to receive downlink transmissions via one or more UE receive beams 510, which may be configured using different beamforming parameters at receive circuitry of the UE 120. The UE 120 may identify a particular NN transmit beam 505, shown as NN transmit beam 505-A, and a particular UE receive beam 510, shown as UE receive beam 510-A, that provide relatively favorable performance (for example, that have a best channel quality of the different measured combinations of NN transmit beams 505 and UE receive beams 510). In some examples, the UE 120 may transmit an indication of which NN transmit beam 505 is identified by the UE 120 as a preferred NN transmit beam, which the network node 110 may select for transmissions to the UE 120. The UE 120 may thus attain and maintain a beam pair link (BPL) with the network node 110 for downlink communications (for example, a combination of the NN transmit beam 505-A and the UE receive beam 510-A), which may be further refined and maintained in accordance with one or more established beam refinement procedures.

A downlink beam, such as an NN transmit beam 505 or a UE receive beam 510, may be associated with a TCI state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each NN transmit beam 505 may be associated with a synchronization signal block (SSB), and the UE 120 may indicate a preferred NN transmit beam 505 by transmitting uplink transmissions in resources of the SSB that are associated with the preferred NN transmit beam 505. A particular SSB may have an associated TCI state (for example, for an antenna port or for beamforming). The network node 110 may, in some examples, indicate a downlink NN transmit beam 505 based at least in part on antenna port QCL properties that may be indicated by the TCI state. A TCI state may be associated with one downlink reference signal set (for example, an SSB and an aperiodic, periodic, or semi-persistent CSI reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 510 at the UE 120. Thus, the UE 120 may select a corresponding UE receive beam 510 from a set of BPLs based at least in part on the network node 110 indicating an NN transmit beam 505 via a TCI indication.

In some examples, the network node 110 may maintain a set of activated TCI states for downlink shared channel transmissions and a set of activated TCI states for downlink control channel transmissions. The set of activated TCI states for downlink shared channel transmissions may correspond to beams that the network node 110 uses for downlink transmission on a PDSCH. The set of activated TCI states for downlink control channel communications may correspond to beams that the network node 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the network node 110 using a directional UE transmit beam, and the network node 110 may receive the transmission using a directional NN receive beam. Each UE transmit beam may have an associated beam ID, beam direction, or beam symbols, among other examples. The UE 120 may transmit uplink communications via one or more UE transmit beams 515.

The network node 110 may receive uplink transmissions via one or more NN receive beams 520 (e.g., BS receive beams). The network node 110 may identify a particular UE transmit beam 515, shown as UE transmit beam 515-A, and a particular NN receive beam 520, shown as NN receive beam 520-A, that provide relatively favorable performance (for example, that have a best channel quality of the different measured combinations of UE transmit beams 515 and NN receive beams 520). In some examples, the network node 110 may transmit an indication of which UE transmit beam 515 is identified by the network node 110 as a preferred UE transmit beam, which the network node 110 may select for transmissions from the UE 120. The UE 120 and the network node 110 may thus attain and maintain a BPL for uplink communications (for example, a combination of the UE transmit beam 515-A and the NN receive beam 520-A), which may be further refined and maintained in accordance with one or more established beam refinement procedures. In some examples, an uplink beam, such as a UE transmit beam 515 or an NN receive beam 520, may be associated with a spatial relation. A spatial relation may indicate a directionality or a characteristic of the uplink beam, similar to one or more QCL properties, as described above.

In some examples, the network node 110 and the UE 120 may use a unified TCI framework for both downlink and uplink beam indications. A "unified TCI" (also referred to as a "shared unified TCI") refers to a TCI that indicates a TCI state (e.g., a "unified TCI state" or a "share unified TCI state) that is applicable to multiple channels. For example, a unified TCI state may be applicable to at least UE-dedicated PDCCH and PDSCH and/or PUSCH and UE-dedicated PUCCH. In the unified TCI framework, for communications between the network node 110 and the UE 120, unified TCI state indications may be used to indicate a joint downlink and uplink TCI state or to indicate separate downlink and uplink TCI states. The unified TCI state indication of a joint uplink and downlink TCI state may be used to indicate a beam direction for downlink channels (e.g., PDSCH and PDCCH) or reference signals (e.g., CSI-RS s) and for uplink channels (e.g., PUSCH and PUCCH) or reference signals (e.g., sounding reference signals (SRSs)). The unified TCI state indication of a separate downlink TCI state may be used to indicate a beam direction for multiple downlink channels (e.g., PDSCH and PDCCH) or reference signals (e.g., CSI-RSs). The unified TCI state indication of a separate uplink TCI state may be used to indicate a beam direction to be used for multiple uplink channels (e.g., PUSCH and PUCCH) or reference signals (e.g., SRSs). In some examples, the unified TCI state indication may be "sticky," such that the indicated beam direction will be used for the channels and/or reference signals to which the TCI state indication applies until a further indication is received. In this way, the unified TCI state indication may be applicable to multiple communications (e.g., downlink and/or uplink communications) on multiple channels.

In some examples, there may be two TCI state indication modes in the unified TCI state framework for downlink and uplink communications. A first mode may be a separate downlink and uplink TCI state indication mode, in which separate downlink and uplink TCI states are used to indicate downlink and uplink beam directions for the UE 120. For example, the separate downlink and uplink TCI state indication mode may be used when the UE 120 is having maximum permissible exposure (MPE) issues to indicate different beam directions, for the UE 120, for an uplink beam (e.g., a UE Tx beam) and a downlink beam (e.g., a UE Rx beam). A second mode may be a joint downlink and uplink TCI state indication mode, in which a TCI state indication is used to indicate, to the UE 120, a joint uplink and downlink beam direction. For example, the joint downlink and uplink TCI state indication mode may be used when the UE 120 has channel correspondence between downlink and uplink channels (which may be assumed in some examples), and the same beam direction can be used for an uplink beam (e.g., a UE Tx beam) and a downlink beam (e.g., a UE Rx beam).

As indicated above, FIG. 5 is provided as an example. Other examples may differ from what is described with respect to FIG. 5.

Figure 6:
FIG. 6 is a diagram illustrating an example of a sidelink transmission configuration indicator (TCI) medium access control (MAC) control element (MAC-CE), in accordance with the present disclosure.

FIG. 6 is a diagram illustrating an example 600 of a sidelink TCI medium access control (MAC) control element (MAC-CE), in accordance with the present disclosure.

In some examples, a TCI state indication may be used to indicate a sidelink beam for a sidelink communication between a first UE and a second UE. For example, the first UE may transmit, to the second UE, a PC5 RRC message that configures a list of sidelink TCI states with respective source sidelink reference signals that provide QCL properties for the sidelink TCI states. In this case, the configuration of each sidelink TCI state may be extended, as compared to a configuration of a downlink TCI state, to indicate whether the respective source reference signal is a transmit reference signal or a receive reference signal. The first UE may transmit, to the second UE, a sidelink TCI MAC-CE for beam indication (e.g., by indicating a sidelink TCI state to be used for a sidelink communication) or for activation or deactivation of one or more TCI states. For example, the sidelink TCI MAC-CE may indicate a set of activated TCI states, and the first UE may indicate, in a TCI field in SCI-2 transmitted to the second UE, a TCI codepoint that indicates a sidelink TCI state for a sidelink communication.

As shown in FIG. 6, the sidelink TCI MAC-CE may indicate a serving cell ID that indicates a serving cell and a bandwidth (BWP) part ID that indicates a sidelink BWP. The sidelink TCI MAC-CE may indicate two target sidelink channels (e.g., a first target sidelink channel and a second target sidelink channel) for which activated sidelink TCIs are indicated in the sidelink TCI MAC-CE. The sidelink TCI MAC-CE may include a first channel ID field that indicates whether the first target sidelink is a PSCCH, a PSSCH, or a PSFCH, and a second channel ID field that indicates whether the second target sidelink is a PSCCH, a PSSCH, or a PSFCH. The sidelink TCI MAC-CE may include a respective Tx/Rx field associated with each of the first channel ID field and the second channel ID field. The Tx/Rx field may include one bit that indicates whether the target sidelink channel indicated in the associated channel ID field is to be received or transmitted by the second UE. The sidelink TCI MAC-CE may indicate N pairs of activated sidelink TCI states (e.g., TCI state $ID_{0,1}$, TCI state $ID_{0,2}$, ..., TCI state $ID_{N,1}$, TCI state $ID_{N,2}$). In each pair of activated sidelink TCI states, TCI state $ID_{x,1}$ indicates a sidelink TCI state for the first target sidelink channel, and TCI state $ID_{x,2}$ indicates a sidelink TCI state for the second target sidelink channel. Each of the N pairs of activated TCI states may map to a respective TCI codepoint that may be indicated in SCI (or in DCI received from a network node). In this way, one TCI codepoint indicated in the TCI field of the SCI-2 may indicates respective TCI states for two target sidelink channels.

As indicated above, FIG. 6 is provided as an example. Other examples may differ from what is described with respect to FIG. 6.

In the sidelink TCI framework described above in connection with FIG. 6, although one TCI codepoint may be used to indicate respective TCI states for two sidelink channels, a separate TCI state must be indicated for each sidelink communication on each sidelink channel. However, in sidelink communications, the PSCCH and the PSSCH may be in the same subchannel, and the PSSCH may map to a particular PSFCH. Accordingly, the same TCI state is likely to be used for all sidelink channels. Therefore, a sidelink unified TCI state that is applicable to multiple sidelink channels may provide a benefit of reduced signaling overhead for indicating beams for sidelink communications.

Some techniques and apparatuses described herein enable a first UE to transmit, to a second UE, an indication of at least one sidelink unified TCI state. The at least one sidelink unified TCI state may include at least one of a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link. The first UE may communicate with the second UE on at least one of the forward link or the reverse link based at least in part on the indication of the sidelink unified TCI state. As a result, the signaling overhead for indicating beams for sidelink communications may be reduced.

Figure 7A:
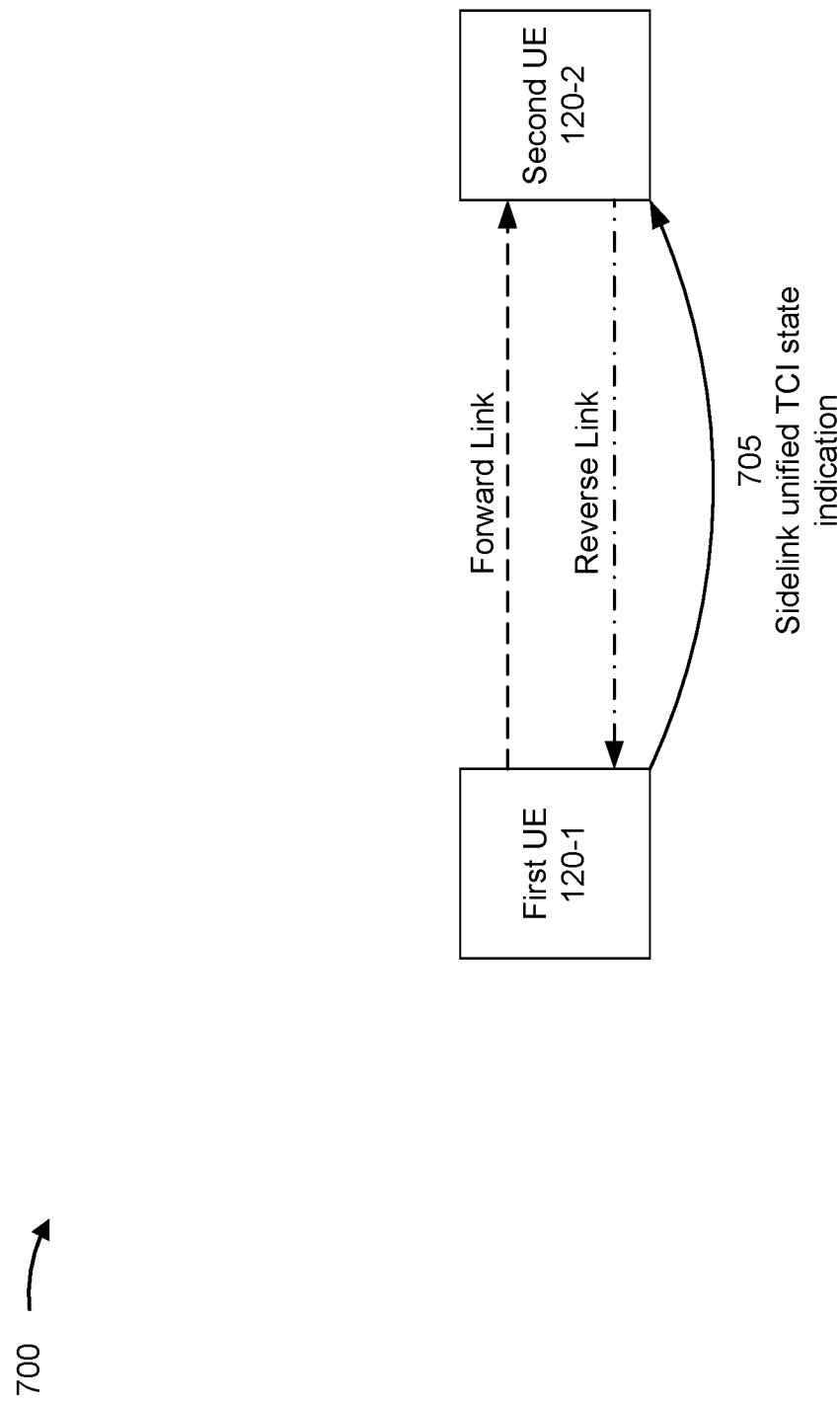

FIGS. 7A-7D are diagrams illustrating an example 700 associated with applying a sidelink unified TCI state, in accordance with the present disclosure. As shown in FIG. 7A, example 700 includes communication between a first UE 120-1 and a second UE 120-2. In some aspects, the first UE 120-1 and the second UE 120-2 may be included in a wireless network, such as wireless network 100. The first UE 120-1 and the second UE 120-2 may communicate via a sidelink communications (e.g., via the PC5 interface).

As shown in FIG. 7A, and by reference number 705, the first UE 120-1 may transmit, and the second UE 120-2 may receive, a sidelink unified TCI state indication. The sidelink unified TCI state indication may be an indication of a sidelink unified TCI state that is applicable to multiple sidelink channels on a forward link and/or between the first UE 120-1 and the second UE 120-2 and/or a multiple sidelink channels on a reverse link between the first UE 120-1 and the second UE 120-2. The sidelink unified TCI (or sidelink unified TCI state) may also be referred to herein as a "sidelink shared unified TCI" (or "sidelink shared unified TCI state"). In some aspects, the sidelink unified TCI state indication may indicate a joint TCI state applicable to the forward link and the reverse link. In some aspects, the sidelink unified TCI state indication may indicate a separate forward link TCI state applicable to the forward link and/or a separate reverse link TCI state application to the reverse link. In some aspects, the sidelink TCI state indication may be included in SCI. For example, the sidelink TCI state indication may be a TCI codepoint included in a TCI field in SCI-2. In some aspects, the sidelink TCI state indication may be included in a MAC-CE (e.g., a PC5 MAC-CE).

Figure 7B:
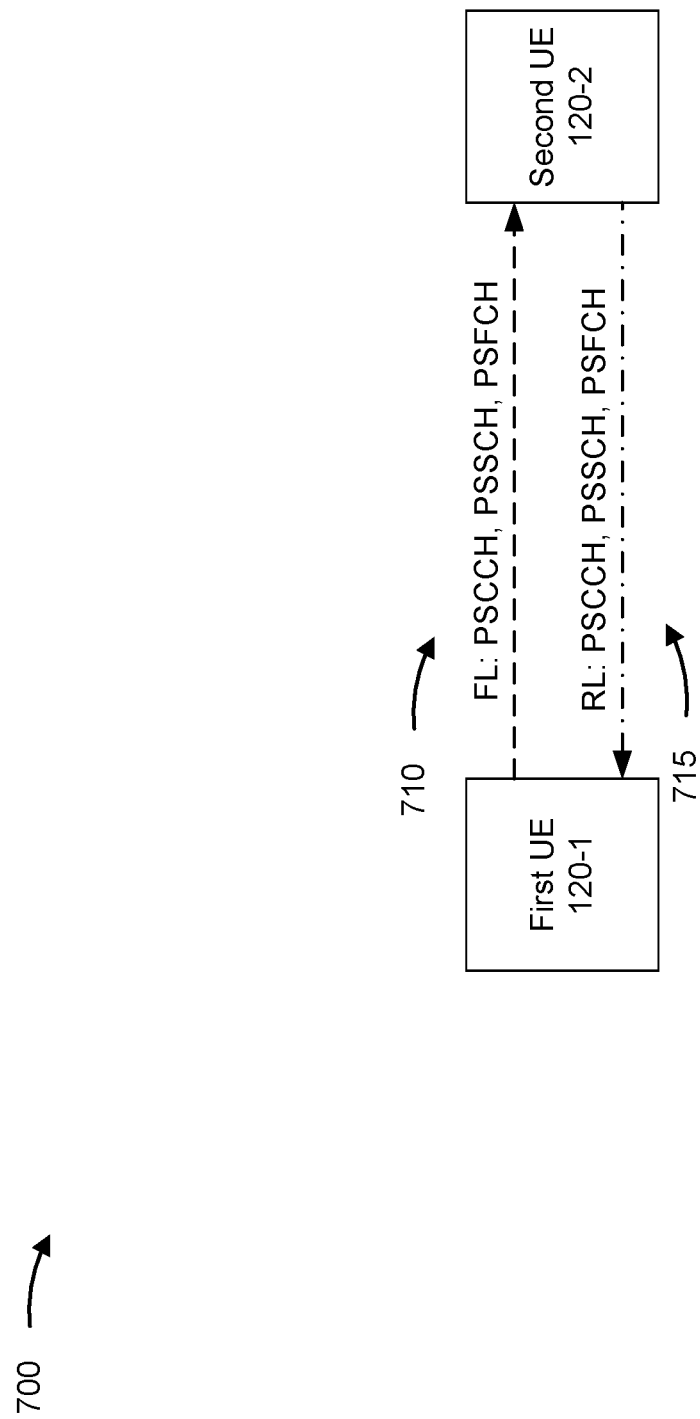

The directions of the forward link and the reverse link may be defined from the perspective of the UE that transmits the sidelink unified TCI state indication (e.g., the first UE 120-1). For example, the forward link may be associated with sidelink transmissions (e.g., PSCCH and PSSCH transmissions) from the first UE 120-1 to the second UE 120-2, and the reverse link may be associated with sidelink transmissions (e.g., PSCCH and PSSCH transmissions) from the second UE 120-2 to the first UE 120-1. FIG. 7B shows a first option (Option 1) for defining the sidelink channels of the forward link and the reverse link, and FIG. 7C shows a second option (Option 2) for defining the sidelink channels of the forward link and the reverse link.

As shown in FIG. 7B, and by reference number 710, in Option 1, the sidelink channels of the forward link (FL) include the PSCCH transmitted from the first UE 120-1 to the second UE 120-2, the PSSCH transmitted from the first UE 120-1 to the second UE 120-2, and the PSFCH transmitted from the first UE 120-1 to the second UE 120-2. As shown by reference number 715, in Option 1, the sidelink channels of the reverse link (RL) include the PSCCH transmitted from the second UE 120-2 to the first UE 120-1, the PSSCH transmitted from the second UE 120-2 to the first UE 120-1, and the PSFCH transmitted from the second UE 120-2 to the first UE 120-1. That is, in some aspects (e.g., in Option 1), the forward link may include all sidelink channels transmitted in a direction from the first UE 120-1 to the second UE 120-2, and the reverse link may include all sidelink channels transmitted in a direction from the second UE 120-2 to the first UE 120-1. In this case, a sidelink unified TCI state indication that is applicable to the forward link (e.g., a joint forward link and reverse link TCI state indication or a separate forward link TCI state indication) is applicable to the PSCCH, the PSSCH, and the PSFCH transmitted from the first UE 120-1 to the second UE 120-2, and a sidelink unified TCI state indication that is applicable to the reverse link (e.g., a joint forward link and reverse link TCI state indication or a separate reverse link TCI state indication) is applicable to the PSCCH, the PSSCH, and the PSFCH transmitted from the second UE 120-2 to the first UE 120-1. In some aspects, in Option 1, when using separate forward link and reverse link TCI states, the sidelink unified TCI state indication may be required to indicate both the separate forward link TCI state and the separate reverse link TCI state.

As shown in FIG. 7C, and by reference number 720, in Option 2, the sidelink channels of the forward link include the PSCCH transmitted from the first UE 120-1 to the second UE 120-2, the PSSCH transmitted from the first UE 120-1 to the second UE 120-2, and the PSFCH transmitted from the second UE 120-2 to the first UE 120-1. As shown by reference number 725, in Option 2, the sidelink channels of the reverse link include the PSCCH transmitted from the second UE 120-2 to the first UE 120-1, the PSSCH transmitted from the second UE 120-2 to the first UE 120-1, and the PSFCH transmitted from the first UE 120-1 to the second UE 120-2. That is, in some aspects (e.g., in Option 2), the forward link may include sidelink channels in which the first UE 120-1 transmits PSCCH and PSSCH communications to the second UE 120-2 and a sidelink channel in which the first UE 120-1 receives, from the second UE 120-2, the PSFCH feedback associated with the PSSCH communications transmitted to the second UE 120-2. Similarly, the reverse link may include sidelink channels in which the second UE 120-2 transmits PSCCH and PSSCH communications to the first UE 120-1 and a sidelink channel in which the second UE 120-2 receives, from the first UE 120-1, the PSFCH feedback associated with the PSSCH communications transmitted to the first UE 120-1. In some aspects, Option 2 may be used in a case in which the first UE 120-1 transmits unidirectional sidelink traffic to the second UE 120-2. In this case, there will be no PSFCH feedback transmitted from the first UE 120-1 to the second UE 120-2, and a sidelink unified TCI state indication that indicates a separate forward link TCI state indication may be applicable to the PSCCH and PSSCH for transmitting the unidirectional traffic from the first UE 120-1 to the second UE 120-2 and the PSFCH for transmitting the sidelink feedback (for the unidirectional traffic) from the second UE 120-2 to the first UE 120-1.

Figure 7D:
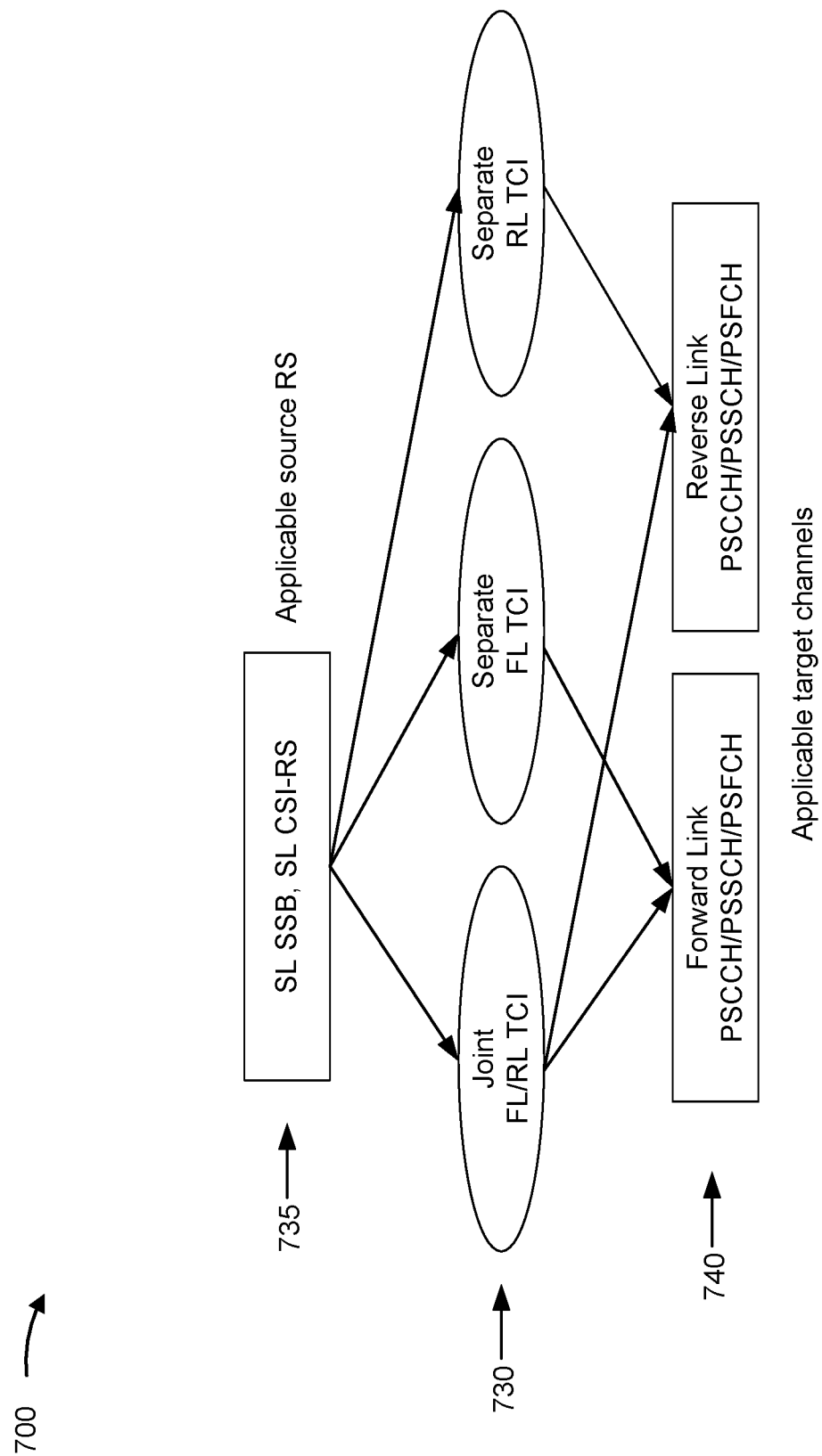

FIG. 7D shows the applicable source reference signal and the applicable target sidelink channels for each type of sidelink unified TCI. As shown in FIG. 7D, and by reference number 730, the types of the sidelink unified TCI may include a joint forward link and reverse link (joint FL/RL) TCI, a separate forward link TCI, and a separate reverse link TCI. As shown by reference number 735, for each type of sidelink unified TCI, the source reference signal that determines one or more QCL properties may be a sidelink SSB or a sidelink CSI-RS. As shown by reference number 740, the applicable target channels for the joint forward link and reverse link TCI may include the PSCCH, the PSSCH, and the PSFCH on both the forward link and the reverse link (e.g., in accordance with Option 1 or Option 2). As further shown by reference number 740, the applicable target channels for the separate forward link TCI may include the PSCCH, the PSSCH, and the PSFCH on the forward link (e.g., in accordance with Option 1 or Option 2). As further shown by reference number 740, the applicable target channels for the separate reverse link TCI may include the PSCCH, the PSSCH, and the PSFCH on the reverse link (e.g., in accordance with Option 1 or Option 2).

As indicated above, FIGS. 7A-7D are provided as an example. Other examples may differ from what is described with respect to FIGS. 7A-7D.

Figure 8A:
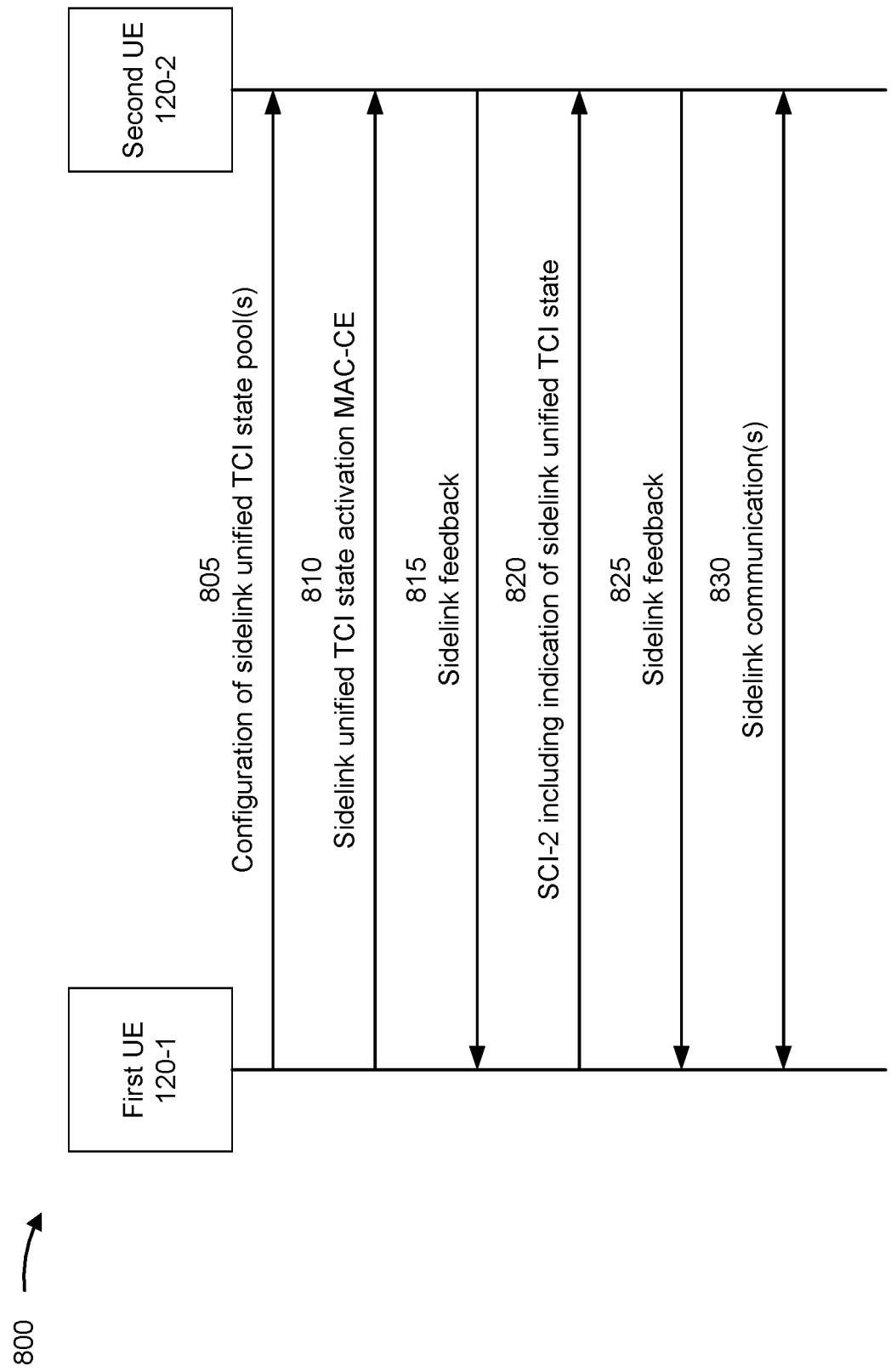

FIGS. 8A-8E are diagrams illustrating an example 800 associated with applying a sidelink unified TCI state, in accordance with the present disclosure. As shown in FIG. 8A, example 800 includes communication between a first UE 120-1 and a second UE 120-2. In some aspects, the first UE 120-1 and the second UE 120-2 may be included in a wireless network, such as wireless network 100. The first UE 120-1 and the second UE 120-2 may communicate via sidelink communications (e.g., via the PC5 interface).

As shown in FIG. 8A, and by reference number 805, the first UE 120-1 may transmit, and the second UE 120-2 may receive, a configuration of one or more sidelink unified TCI state pools. For example, the first UE 120-1 may transmit the configuration to the second UE 120-2 in a PC5 RRC message. The configuration may define a joint and forward link TCI state pool and a reverse link TCI state pool. The joint and forward link TCI state pool may indicate respective TCI state IDs and respective source reference signals for a plurality of sidelink unified TCI states to be used for joint forward link and reverse link TCI states or separate forward link TCI states. The reverse link TCI state pool may indicate respective TCI state IDs and respective source reference signals for a plurality of sidelink unified TCI states to be used for separate reversed link TCI states. In some aspects, the configuration may include separate pools of sidelink unified TCI states (e.g., a first sidelink unified TCI state pool and a second sidelink unified TCI state pool, respectively) for the joint and forward link TCI state pool and the reverse link TCI state pool. In some aspects, the configuration may include one pool of sidelink unified TCI states that includes the joint and forward link TCI state pool and the reverse link TCI state pool.

In some aspects, the configuration may include an indication of a sidelink unified TCI state type (e.g., sl-unifiedtci-state-type) that indicates whether separate forward link TCI states and separate reverse link TCI states or joint forward link and reverse link TCI states are to be used for sidelink communications between the first UE 120-1 and the second UE 120-2. For example, the indication of a sidelink unified TCI state type (e.g., sl-unifiedtci-state-type) may be enumerated as {slSeperateFLRL, slJoinFLRL} to indicate whether sidelink unified TCI state type configured for the sidelink communications is the separate forward link and reverse link TCI state or the joint forward link and reverse link TCI state.

As further shown in FIG. 8A, and by reference number 810, the first UE 120-1 may transmit, and the second UE 120-2 may receive, a sidelink unified TCI state activation MAC-CE. The sidelink unified TCI state activation MAC-CE may be a PC5 MAC-CE that indicates a set of activated sidelink unified TCI states for the first UE 120-1 and the second UE 120-2. The sidelink activation MAC-CE may also be used to deactivate sidelink unified TCI states that were previously activated, and may also be referred to a sidelink unified TCI state deactivation MAC-CE or a sidelink unified TCI state activation/deactivation MAC-CE.

Figure 8B:
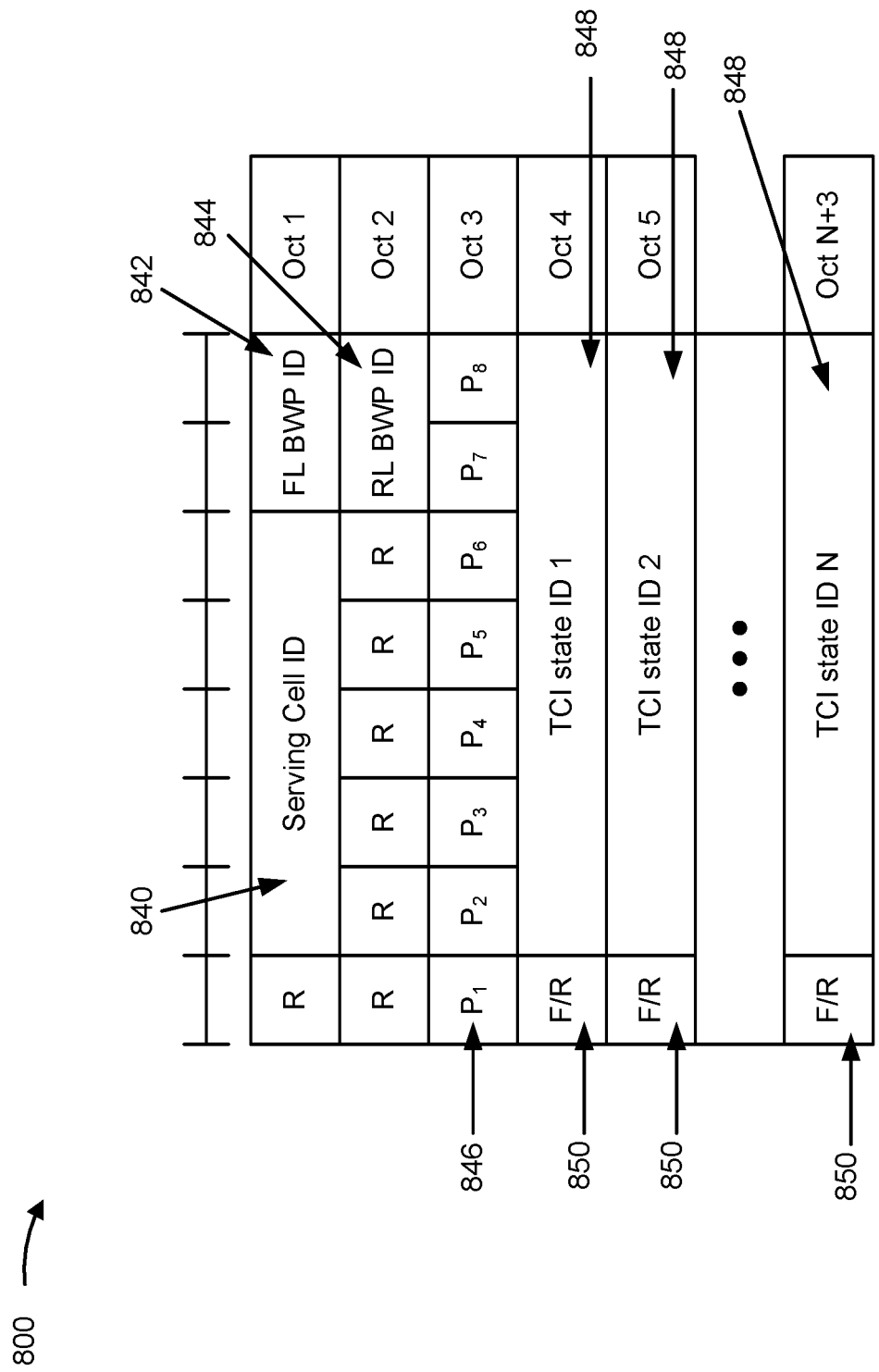

FIG. 8B shows an example of the sidelink unified TCI state activation MAC-CE. As shown in FIG. 8B, sidelink unified TCI state activation MAC-CE may include a serving cell ID field 840 that indicates a serving cell for the sidelink communications, a forward link BWP ID field 842 that indicates a sidelink BWP for the forward link, and a reverse link BWP ID field 844 that indicates a sidelink BWP for the reverse link. For example, a first octet of bits (Oct 1) of the sidelink unified TCI state activation MAC-CE may include the serving cell ID field 840 and the forward link BWP ID field 842, and a second octet (Oct 2) may include the reverser link BWP ID field 844. The sidelink unified TCI state activation MAC-CE may include a respective $P_i$ field 846 for each TCI codepoint value of a set of TCI codepoint values. For example, a third octet (Oct 3) may include 8 one-bit $P_i$ fields 846 ($P_1$-$P_8$) corresponding to eight TCI codepoint values (e.g., 000, 001, . . . , 111). Each $P_i$ field 846 may indicate whether the corresponding TCI codepoint value maps to a single sidelink unified TCI state or multiple (e.g., 2) sidelink unified TCI states. For example, a first value (e.g., 0) in the $P_i$ field 846 may indicate that the corresponding TCI codepoint value indicates/maps to a single sidelink unified TCI state (e.g., a joint forward link and reverse link TCI state, a separate forward link TCI state, or a separate reverse link TCI state), and a second value (e.g., 1) in the $P_i$ field 846 may indicate that the corresponding TCI codepoint value indicates/maps to two sidelink unified TCI states (e.g., a separate forward link TCI state and a separate reverse link TCI state).

The sidelink unified TCI state activation MAC-CE may indicate a list of activated sidelink unified TCI states of the plurality sidelink unified TCI states included in the one or more sidelink unified TCI state pools. As shown in FIG. 8B, the sidelink unified TCI state activation MAC-CE may include, for each of N activated sidelink unified TCI states, a respective TCI state ID field 848 that indicates a TCI state ID that identifies the activated sidelink unified TCI state. For example, the TCI state ID may indicate an activate sidelink unified TCI state from the one or more sidelink unified TCI state pools in the configuration. In some aspects, the sidelink unified TCI state activation MAC-CE may include respective F/R field 850 associated with each TCI state ID field 848. For example, the respective F/R field 850, for each TCI state ID field 848, may be a one-bit indication included in the same aspect as the corresponding TCI state ID 848. The F/R field 850 may indicate whether the TCI state ID indicated in the corresponding TCI state ID field 848 (e.g., the TCI state ID field in the same octet) is for joint or forward link TCI state or a reverse link TCI state. For example, a first value (e.g., 0) in the F/R field 850 may indicate that the TCI state ID indicated in the corresponding TCI state ID field 848 maps to the joint and forward link TCI state pool, and a second value (e.g., 1) in the F/R field 850 may indicate that the TCI state ID indicated in the corresponding TCI state ID field 848 maps to the reverse link TCI state pool. In some aspects, the N activated sidelink unified TCI states indicated in the N TCI state ID fields 848 (e.g., included in N respective octets of the sidelink unified TCI state activation MAC-CE) may include one or more (e.g., 1 or 2) activated sidelink unified TCI states for each TCI codepoint value. For example, each TCI codepoint value may map to one TCI state ID field 848 or two TCI state ID fields based on the value indicated in the respective $P_i$ field 846 for that TCI codepoint value.

Returning to FIG. 8A, as shown by reference number 815, the second UE 120-2 may transmit, and the first UE 120-1 may receive, sidelink feedback in connection with the sidelink unified TCI state activation MAC-CE. The second UE 120-2 may transmit, sidelink feedback (e.g., in a PSFCH communication) indicating an ACK or a NACK in connection with receiving the sidelink communication (e.g., a PSSCH communication) including the sidelink unified TCI state activation MAC-CE. For example, the second UE 120-2 may transmit a PSFCH ACK in connection with successfully decoding the sidelink communication (e.g., the PSSCH communication) including the sidelink unified TCI state activation MAC-CE, or the second UE 120-2 may transmit a PSFCH NACK in connection with unsuccessfully decoding the sidelink communication (e.g., the PSSCH communication) including the sidelink unified TCI state activation MAC-CE.

Figure 8C:
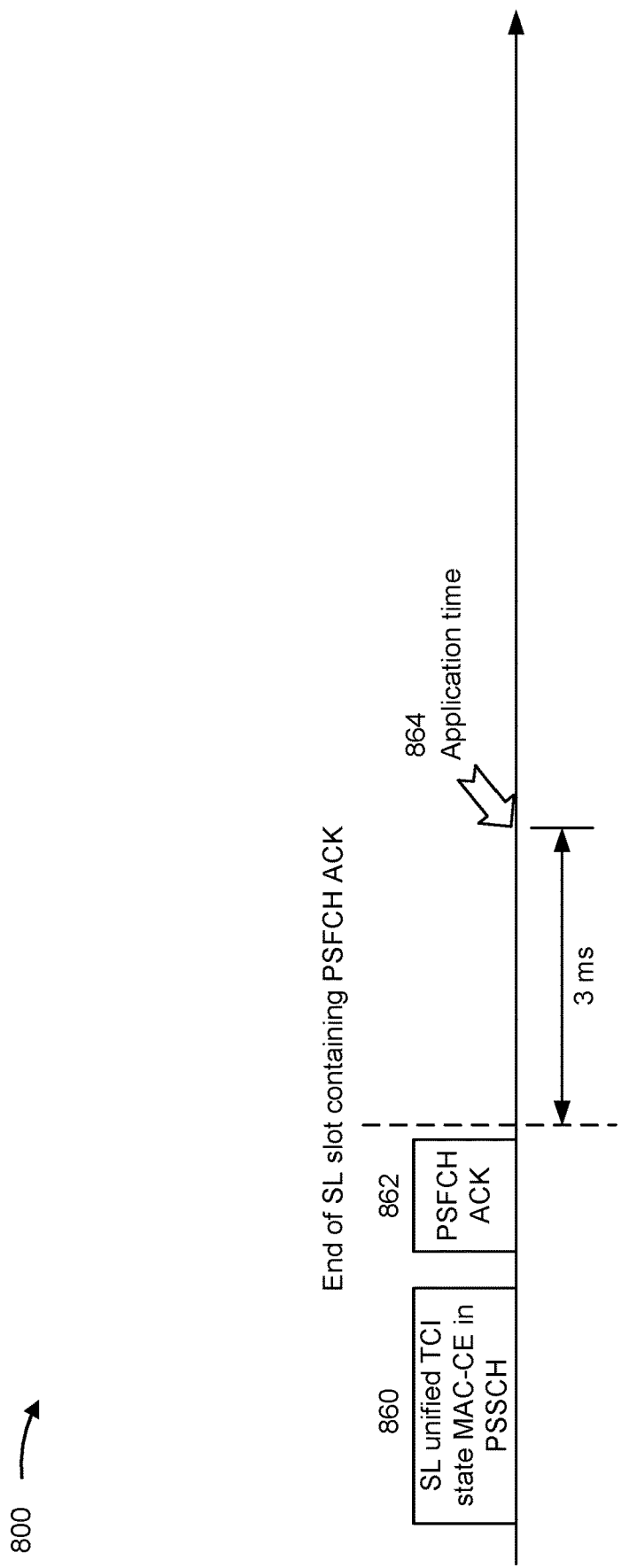

In some aspects, the set of activated sidelink unified TCI states indicated in the sidelink unified TCI state activation MAC-CE may be activated at an application time after a time duration (e.g., an application time duration) from the second UE 120-2 transmitting, and the first UE 120-1 receiving, ACK feedback (e.g., a PSFCH ACK) in connection with the sidelink unified TCI state activation MAC-CE. As shown in FIG. 8C, and by reference number 860, the first UE 120-1 may transmit, to the second UE 120-2, a PSSCH communication including the sidelink unified TCI state activation MAC-CE. As shown by reference number 862, the second UE 120-2 may transmit, to the first UE 120-1, a PSFCH ACK in connection with receiving the PSSCH communication including the sidelink unified TCI state activation MAC-CE. As shown by reference number 864, the set of activated sidelink unified TCI states indicated in the sidelink unified TCI state activation MAC-CE may be activated at an application time after an application time duration from the end of a slot in which the PSFCH ACK is transmitted. For example, the application time duration for the MAC-CE based sidelink unified TCI state activation may be 3 ms. In some aspects, previously activated sidelink unified TCI states, that are not indicated in the sidelink unified TCI state activation MAC-CE, may be deactivated at the application time for the sidelink unified TCI state activation MAC-CE.

Returning to FIG. 8A, as shown by reference number 820, the first UE 120-1 may transmit, and the second UE 120-2 may receive, SCI including an indication of at least one sidelink unified TCI state. For example, the indication of the at least one sidelink unified TCI state may be included in SCI-2 (e.g., in a TCI field in SCI-2) that is transmitted to the second UE 120-2 in a PSSCH communication. In some aspects, the indication of the at least one sidelink unified TCI state may be an indication of a TCI codepoint that indicates at least one activates sidelink unified TCI state of the set of activated sidelink unified TCI states indicated in the sidelink unified TCI state activation MAC-CE. For example, the TCI codepoint value may indicate one activate sidelink unified TCI state (e.g., a joint forward link and reverse link TCI state, a separate forward link TCI state, or a separate reverse link TCI state) or two activated sidelink unified TCI states (e.g., a separate forward link TCI state and a separate reverse link TCI state) based at least in part on the respective $P_i$ field 846 associated with the TCI codepoint value indicated in the SCI. The type of each sidelink unified TCI state indicated by the TCI codepoint may be indicated by the respective F/R field 850 in the sidelink unified TCI state activation MAC-CE and/or by the configured sidelink unified TCI state type (e.g., sl-unifiedTCI-state-type) indicated in the configuration.

As shown by reference number 825, the second UE 120-2 may transmit, and the first UE 120-1 may receive, sidelink feedback in connection with the sidelink communication (e.g., the PSSCH communication) including the SCI-2 that includes the indication of the at least one sidelink unified TCI state. For example, the second UE 120-2 may transmit, sidelink feedback (e.g., in a PSFCH communication) indicating an ACK in connection with successfully decoding the PSSCH communication including the SCI-2 or a NACK in connection with unsuccessfully decoding the PSSCH communication including the SCI-2.

There may be no dedicated ACK feedback for SCI, and different cases of PSFCH feedback may provide implicit indications of whether the sidelink unified TCI state indication included in the SCI-2 was successfully received by the second UE 120-2. In a case in which SCI-1 was not decoded by the second UE 120-2, the second UE 120-2 may not send any PSFCH feedback to the first UE 120-1. In this case, the second UE 120-2 does not receive the sidelink unified TCI state indication. In a case in which the SCI-1 is decoded, but the SCI-2 is not decoded by the second UE 120-2, the second UE 120-2 may not send any PSFCH feedback. In this case, the sidelink unified TCI state indication is not received by the second UE 120-2. In a case in which the SCI-1 and the SCI-2 are decoded by the second UE 120-2, but the second UE 120-2 fails to successfully decode the TB included in the PSSCH, the second UE 120-2 may send a NACK to the first UE 120-1 in the PSFCH. In this case, the sidelink unified TCI state indication may be received by the second UE 120-2. In a case in which the second UE 120-2 successfully decodes the SCI-1, the SCI-2, and the TB included in the PSSCH, the second UE 120-2 may transmit an ACK to the first UE 120-1 in the PSFCH. In this case, the sidelink unified TCI state indication is received by the second UE 120-2.

Figure 8D:
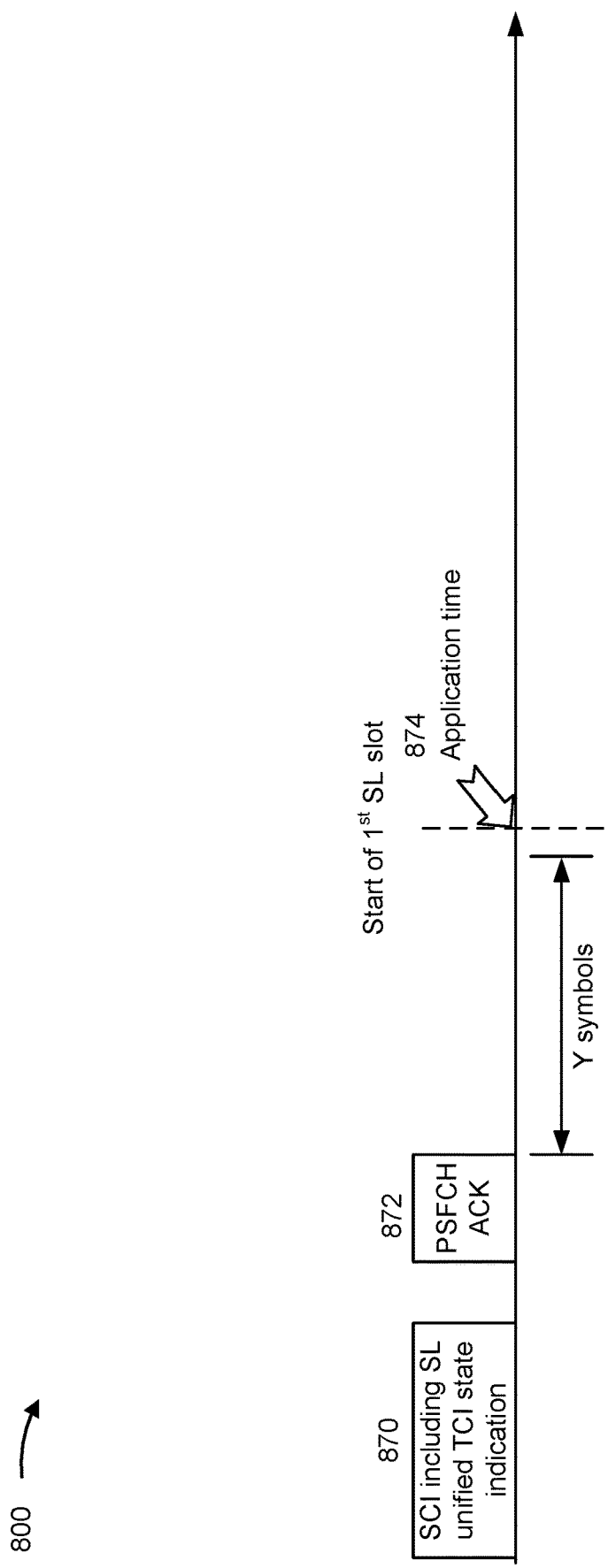

In some aspects, a PSFCH ACK in connection with the PSSCH communication including the SCI-2 that includes the sidelink unified TCI state indication may also serve as an implicit ACK for the SCI that includes the sidelink unified TCI state indication (e.g., an implicit indication that the second UE 120-2 received the sidelink unified TCI state indication). In some aspects, the first UE 120-1 and the second UE 120-2 may apply the at least one sidelink unified TCI state indicated by the sidelink unified TCI state indication based at least in part on the second UE 120-2 transmitting, and the first UE 120-1 receiving, sidelink feedback (e.g., a PSFCH communication) including an ACK in connection with the sidelink communication (e.g., the PSSCH communication) including the SCI-2 that includes the sidelink unified TCI state indication. As shown in FIG. 8D, and by reference number 870, the first UE 120-1 may transmit, to the second UE 120-2, the SCI (e.g., SCI-2) that includes the sidelink unified TCI state indication. As shown by reference number 872, the second UE 120-2 may transmit, to the first UE 120-1, a PSFCH ACK in connection with the sidelink communication (e.g., the PSSCH communication) including the SCI-2 that includes the sidelink unified TCI state indication. As shown by reference number 874, the first UE 120-1 and the second UE 120-2 may apply the at least one sidelink unified TCI state indicated by the sidelink unified TCI state indication at an application time, and the application time may be at a start of a first slot after a quantity of symbols (Y symbols) from an end of the PSFCH ACK.

Figure 8E:
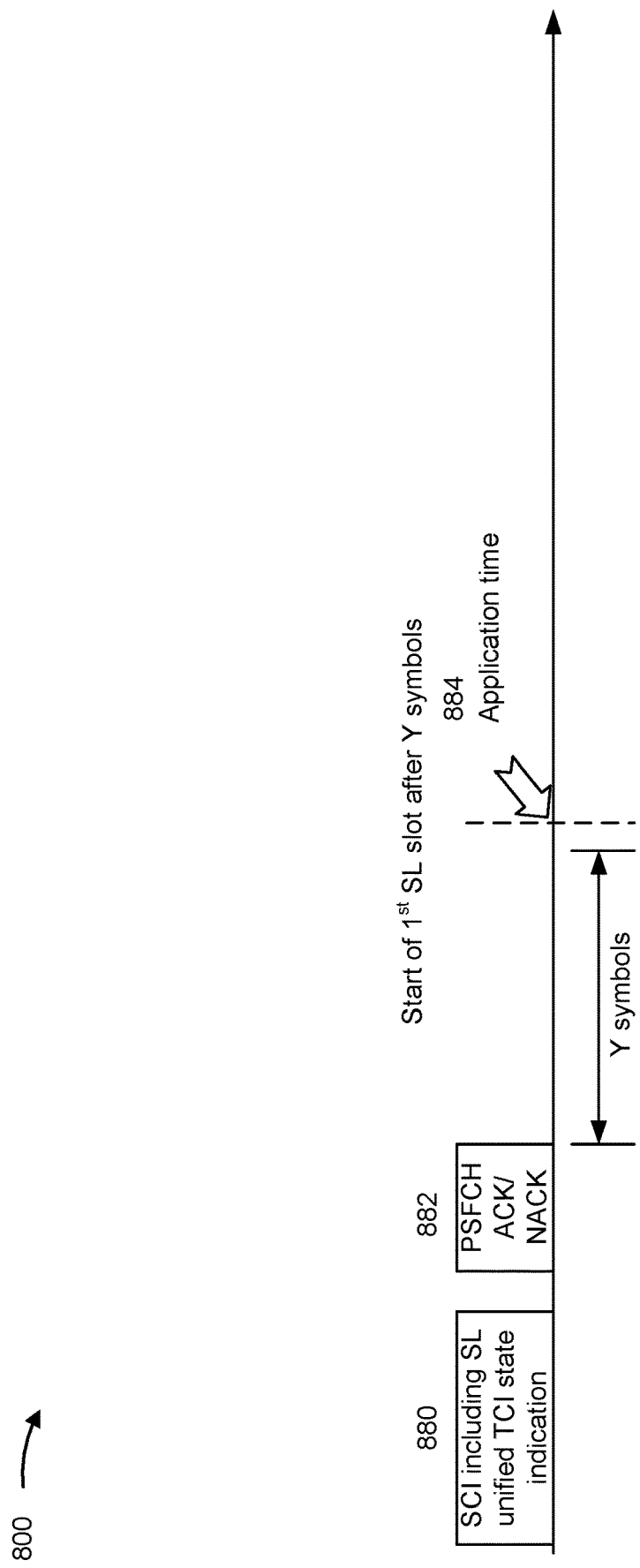

In some aspects, because the second UE 120-2 may transmit a PSFCH NACK in a case in which the second UE 120-2 receives sidelink unified TCI state indication (e.g., in a case in which the second UE 120-2 decodes the SCI-2, but fails to successfully decode the TB included in the PSSCH), a PSFCH ACK or NACK in connection with the PSSCH communication may serve as an implicit ACK for the SCI that includes the sidelink unified TCI state indication (e.g., an implicit indication that the second UE 120-2 received the sidelink unified TCI state indication). In this case, when the first UE 120-1 receives a PSFCH ACK or NACK for the PSSCH communication that includes the TCI field in the SCI-2, the at least in sidelink unified TCI state indicated in the TCI field may be applied at the start of the first slot after a quantity of symbols (e.g., Y symbols) from the end of the PSFCH communication indicating the ACK or the NACK. As shown in FIG. 8E, and by reference number 880, the first UE 120-1 may transmit, to the second UE 120-2, the SCI (e.g., SCI-2) that includes the sidelink unified TCI state indication. As shown by reference number 882, the second UE 120-2 may transmit, to the first UE 120-1 a PSFCH ACK or NACK (PSFCH ACK/NACK) in connection with the PSSCH communication including the SCI-2 that includes the sidelink unified TCI state indication. As shown by reference number 884, the first UE 120-1 and the second UE 120-2 may apply the at least in sidelink unified TCI state indicated by the sidelink unified TCI state indication starting an application time, and the application time may be a start of a first slot after Y symbols from the end of the PSFCH ACK/NACK. In some aspects, whether the first UE 120-1 and the second UE 120-2 are to use the PSFCH NACK (e.g., in addition to the ACK) as an indication of an ACK for the SCI-2 including the sidelink unified TCI state indication may configured (e.g., indicated in the configuration of the unified sidelink TCI state pools) or dynamically indicated (e.g., in a PC5 MAC-CE or SCI) based at least in part on a traffic load.

As indicated above, FIGS. 8A-8E are provided as an example. Other examples may differ from what is described with respect to FIGS. 8A-8E.

Figure 9:
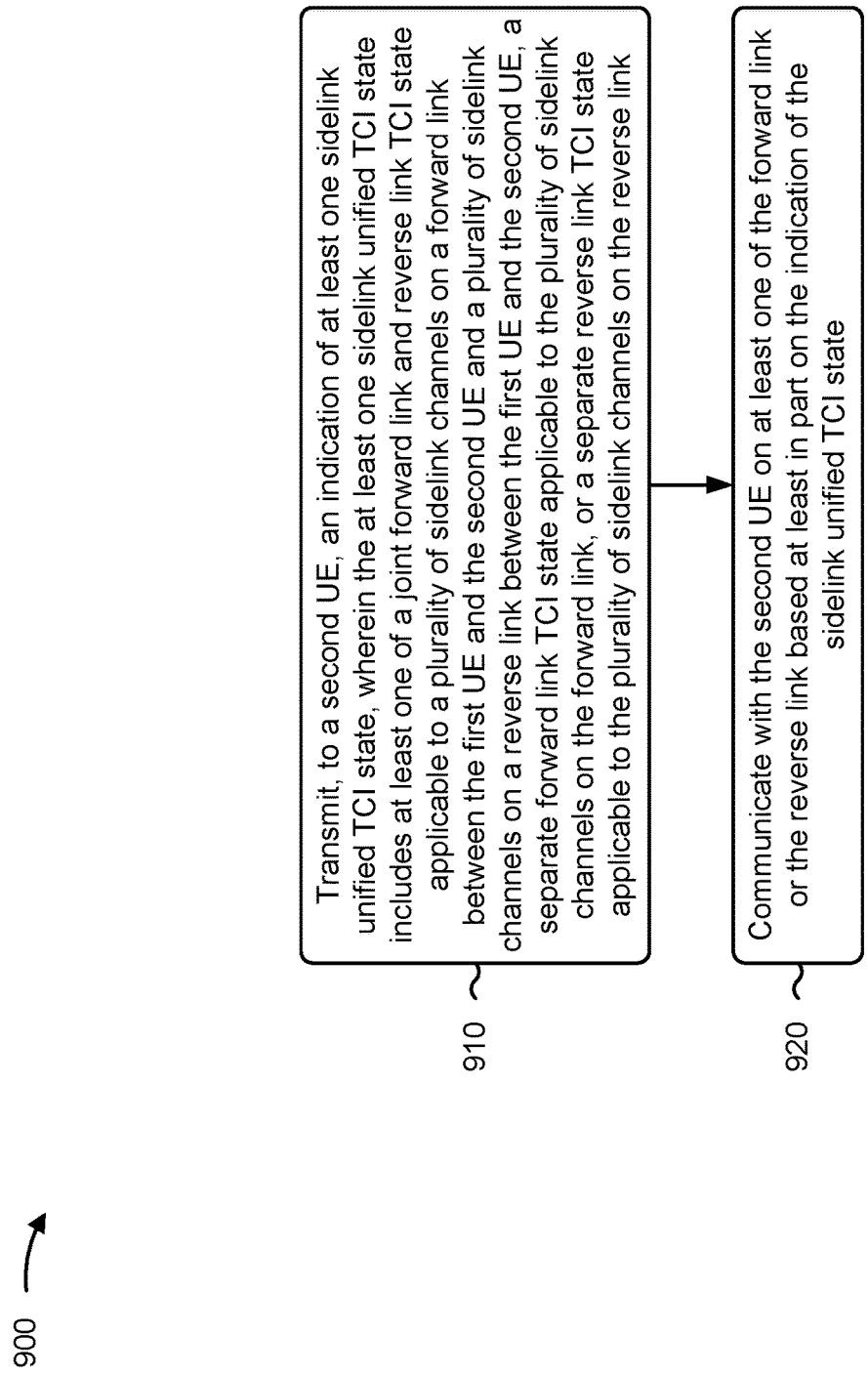
FIGS. 9-10 are diagrams illustrating example processes associated with applying a sidelink unified TCI state, in accordance with the present disclosure.

FIG. 9 is a diagram illustrating an example process 900 performed, for example, by a first UE, in accordance with the present disclosure. Example process 900 is an example where the first UE (e.g., UE 120 and/or first UE 120-1) performs operations associated with applying a sidelink unified TCI state.

As shown in FIG. 9, in some aspects, process 900 may include transmitting, to a second UE, an indication of at least one sidelink unified TCI state, wherein the at least one sidelink unified TCI state includes at least one of a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link (block 910). For example, the first UE (e.g., using communication manager 140 and/or transmission component 1104, depicted in FIG. 11) may transmit, to a second UE, an indication of at least one sidelink unified TCI state, wherein the at least one sidelink unified TCI state includes at least one of a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link, as described above.

As further shown in FIG. 9, in some aspects, process 900 may include communicating with the second UE on at least one of the forward link or the reverse link based at least in part on the indication of the sidelink unified TCI state (block 920). For example, the first UE (e.g., using communication manager 140, reception component 1102, and/or transmission component 1104, depicted in FIG. 11) may communicate with the second UE on at least one of the forward link or the reverse link based at least in part on the indication of the sidelink unified TCI state, as described above.

Process 900 may include additional aspects, such as any single aspect or any combination of aspects described below and/or in connection with one or more other processes described elsewhere herein.

In a first aspect, the plurality of sidelink channels on the forward link include a PSCCH from the first UE to the second UE, a PSSCH from the first UE to the second UE, and a PSFCH from the first UE to the second UE, and the plurality of sidelink channels on the reverse link include a PSCCH from the second UE to the first UE, a PSSCH from the second UE to the first UE, and a PSFCH from the second UE to the first UE.

In a second aspect, alone or in combination with the first aspect, the plurality of sidelink channels on the forward link include a PSCCH from the first UE to the second UE, a PSSCH from the first UE to the second UE, and a PSFCH from the second UE to the first UE, and the plurality of sidelink channels on the reverse link include a PSCCH from the second UE to the first UE, a PSSCH from the second UE to the first UE, and a PSFCH from the first UE to the second UE.

In a third aspect, alone or in combination with one or more of the first and second aspects, transmitting the indication of the at least one sidelink unified TCI state includes transmitting, to the second UE, SCI that includes the indication of the at least one sidelink unified TCI state.

In a fourth aspect, alone or in combination with one or more of the first through third aspects, process 900 includes transmitting, to the second UE, a sidelink unified TCI state activation MAC-CE that indicates a set of activated sidelink unified TCI states, wherein the indication, included in the SCI, is an indication of a TCI codepoint that indicates at least one activated sidelink unified TCI state of the set of activated sidelink unified TCI states.

In a fifth aspect, alone or in combination with one or more of the first through fourth aspects, the sidelink unified TCI state activation MAC-CE includes, for each TCI codepoint value of a set of TCI codepoint values, a respective field that indicates whether that TCI codepoint value indicates a single sidelink unified TCI state or multiple sidelink unified TCI states, and the set of activated sidelink unified TCI states includes, for each TCI codepoint value of the set of TCI codepoint values, one or multiple activated sidelink unified TCI states in accordance with the respective field that indicates whether that TCI codepoint value indicates a single sidelink unified TCI state or multiple sidelink unified TCI states.

In a sixth aspect, alone or in combination with one or more of the first through fifth aspects, process 900 includes transmitting, to the second UE, a configuration of one or more sidelink unified TCI state pools, wherein the set of activated sidelink unified TCI states indicated in the sidelink unified TCI state activation MAC-CE includes activated sidelink unified TCI states of a plurality of sidelink unified TCI states included in the one or more sidelink unified TCI state pools.

In a seventh aspect, alone or in combination with one or more of the first through sixth aspects, the one or more TCI state pools include a first sidelink unified TCI state pool that includes a plurality of sidelink unified TCI states to be used to indicate joint forward link and reverse link TCI states and separate forward link TCI states, and a second unified TCI state pool that includes a plurality of sidelink unified TCI states to be used to indicate separate reverse link TCI states.

In an eighth aspect, alone or in combination with one or more of the first through seventh aspects, the sidelink unified TCI state activation MAC-CE includes, for each activated sidelink unified TCI state of the set of sidelink unified TCI states, a respective TCI state ID field that indicates a TCI state ID for that activated sidelink unified TCI state and a respective field that indicates whether the TCI state ID indicated in the respective TCI state ID field maps to the first sidelink unified TCI state pool or the second sidelink unified TCI state pool.

In a ninth aspect, alone or in combination with one or more of the first through eighth aspects, the configuration indicates a sidelink unified TCI state type, and the sidelink unified TCI state type is a joint forward link and reverse link TCI state or a separate forward link and reverse link TCI state.

In a tenth aspect, alone or in combination with one or more of the first through ninth aspects, transmitting the configuration of the one or more sidelink unified TCI state pools includes transmitting, to the second UE, a PC5 RRC message that includes the configuration of the one or more sidelink unified TCI state pools.

In an eleventh aspect, alone or in combination with one or more of the first through tenth aspects, process 900 includes receiving, from the second UE, sidelink feedback indicating an ACK in connection with transmitting the sidelink unified TCI state activation MAC-CE, wherein the set of activated sidelink unified TCI states indicated in the sidelink unified TCI state activation MAC-CE are activated after an application time duration from an end of a slot in which the sidelink feedback indicating the ACK is received.

In a twelfth aspect, alone or in combination with one or more of the first through eleventh aspects, process 900 includes receiving, from the second UE, sidelink feedback indicating an ACK in connection with a sidelink communication including the SCI that includes the indication of the at least one sidelink unified TCI state, wherein the at least one sidelink unified TCI state is applied at a start of a first slot after a quantity of symbols from an end of the sidelink feedback indicating the ACK.

In a thirteenth aspect, alone or in combination with one or more of the first through twelfth aspects, the SCI that includes the indication of the at least one sidelink unified TCI state is SCI-2 included in a PSSCH communication, and process 900 includes receiving, from the second UE, a PSFCH communication indicating an ACK or a NACK in connection with the PSFCH communication including the SCI-2 that includes the indication of the at least one sidelink unified TCI state, wherein the at least one sidelink unified TCI state is applied at a start of a first slot after a quantity of symbols from an end of the PSFCH communication indicating the ACK or the NACK.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
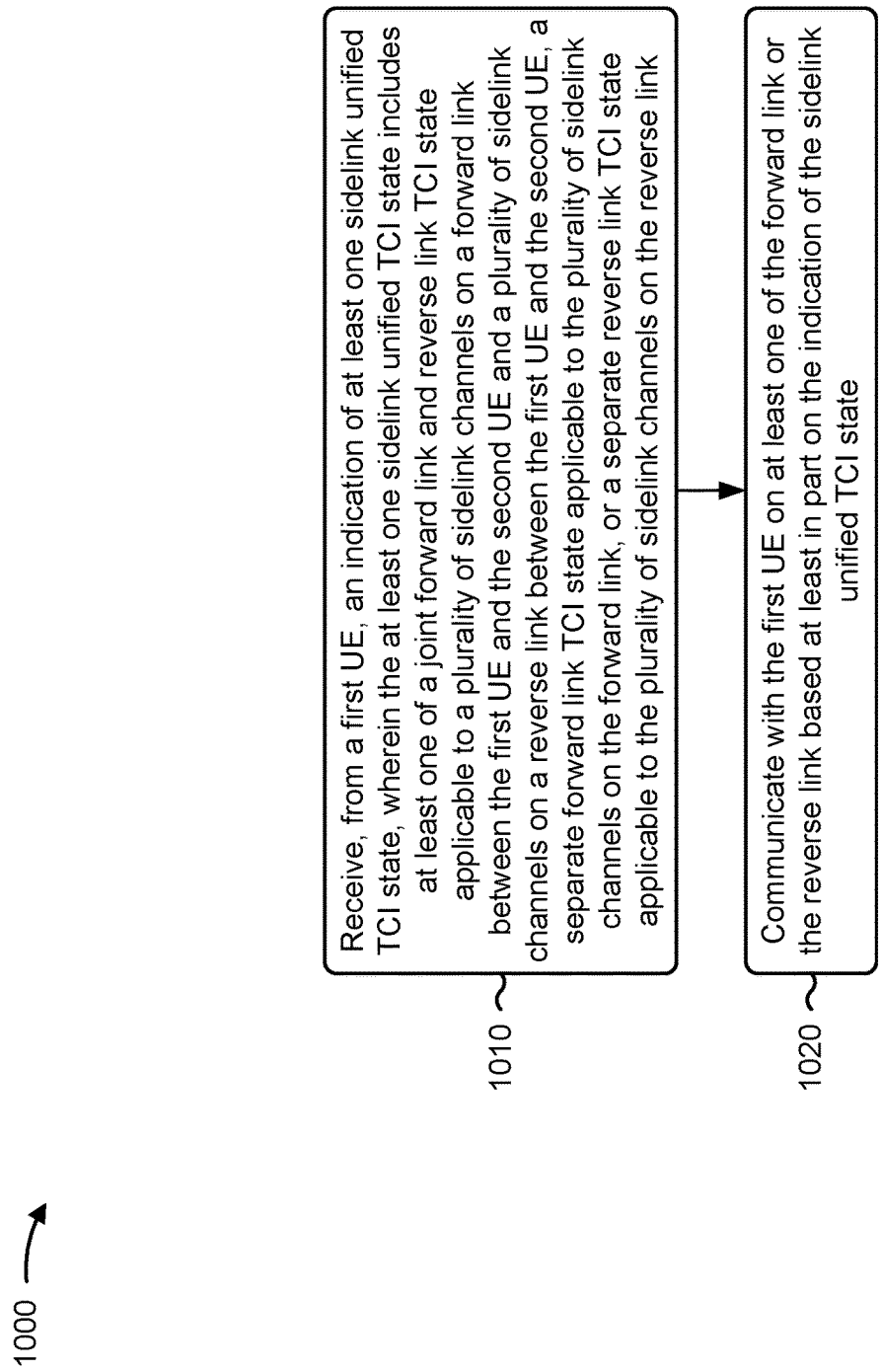

FIG. 10 is a diagram illustrating an example process 1000 performed, for example, by a second UE, in accordance with the present disclosure. Example process 1000 is an example where the second UE (e.g., UE 120 and/or second UE 120-2) performs operations associated with applying a sidelink unified TCI state.

As shown in FIG. 10, in some aspects, process 1000 may include receiving, from a first UE, an indication of at least one sidelink unified TCI state, wherein the at least one sidelink unified TCI state includes at least one of a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link (block 1010). For example, the second UE (e.g., using communication manager 140 and/or reception component 1102, depicted in FIG. 11) may receive, from a first UE, an indication of at least one sidelink unified TCI state, wherein the at least one sidelink unified TCI state includes at least one of a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link, as described above.

As further shown in FIG. 10, in some aspects, process 1000 may include communicating with the first UE on at least one of the forward link or the reverse link based at least in part on the indication of the sidelink unified TCI state (block 1020). For example, the second UE (e.g., using communication manager 140, reception component 1102, and/or transmission component 1104, depicted in FIG. 11) may communicate with the first UE on at least one of the forward link or the reverse link based at least in part on the indication of the sidelink unified TCI state, as described above.

Process 1000 may include additional aspects, such as any single aspect or any combination of aspects described below and/or in connection with one or more other processes described elsewhere herein.

In a first aspect, the plurality of sidelink channels on the forward link include a PSCCH from the first UE to the second UE, a PSSCH from the first UE to the second UE, and a PSFCH from the first UE to the second UE, and the plurality of sidelink channels on the reverse link include a PSCCH from the second UE to the first UE, a PSSCH from the second UE to the first UE, and a PSFCH from the second UE to the first UE.

In a second aspect, alone or in combination with the first aspect, the plurality of sidelink channels on the forward link include a PSCCH from the first UE to the second UE, a PSSCH from the first UE to the second UE, and a PSFCH from the second UE to the first UE, and the plurality of sidelink channels on the reverse link include a PSCCH from the second UE to the first UE, a PSSCH from the second UE to the first UE, and a PSFCH from the first UE to the second UE.

In a third aspect, alone or in combination with one or more of the first and second aspects, receiving the indication of the at least one sidelink unified TCI state includes receiving SCI that includes the indication of the at least one sidelink unified TCI state.

In a fourth aspect, alone or in combination with one or more of the first through third aspects, process 1000 includes receiving, from the first UE, a sidelink unified TCI state activation MAC-CE that indicates a set of activated sidelink unified TCI states, wherein the indication, included in the SCI, is an indication of a TCI codepoint that indicates at least one activated sidelink unified TCI state of the set of activated sidelink unified TCI states.

In a fifth aspect, alone or in combination with one or more of the first through fourth aspects, the sidelink unified TCI state activation MAC-CE includes, for each TCI codepoint value of a set of TCI codepoint values, a respective field that indicates whether that TCI codepoint value indicates a single sidelink unified TCI state or multiple sidelink unified TCI states, and the set of activated sidelink unified TCI states includes, for each TCI codepoint value of the set of TCI codepoint values, one or multiple activated sidelink unified TCI states in accordance with the respective field that indicates whether that TCI codepoint value indicates a single sidelink unified TCI state or multiple sidelink unified TCI states.

In a sixth aspect, alone or in combination with one or more of the first through fifth aspects, process 1000 includes receiving a configuration of one or more sidelink unified TCI state pools, wherein the set of activated sidelink unified TCI states indicated in the sidelink unified TCI state activation MAC-CE includes activated sidelink unified TCI states of a plurality of sidelink unified TCI states included in the one or more sidelink unified TCI state pools.

In a seventh aspect, alone or in combination with one or more of the first through sixth aspects, the one or more TCI state pools include a first sidelink unified TCI state pool that includes a plurality of sidelink unified TCI states to be used to indicate joint forward link and reverse link TCI states and separate forward link TCI states, and a second unified TCI state pool that includes a plurality of sidelink unified TCI states to be used to indicate separate reverse link TCI states.

In an eighth aspect, alone or in combination with one or more of the first through seventh aspects, the sidelink unified TCI state activation MAC-CE includes, for each activated sidelink unified TCI state of the set of sidelink unified TCI states, a respective TCI state ID field that indicates a TCI state ID for that activated sidelink unified TCI state and a respective field that indicates whether the TCI state ID indicated in the respective TCI state ID field maps to the first sidelink unified TCI state pool or the second sidelink unified TCI state pool.

In a ninth aspect, alone or in combination with one or more of the first through eighth aspects, the configuration indicates a sidelink unified TCI state type, and the sidelink unified TCI state type is a joint forward link and reverse link TCI state or a separate forward link and reverse link TCI state.

In a tenth aspect, alone or in combination with one or more of the first through ninth aspects, receiving the configuration of the one or more sidelink unified TCI state pools includes receiving, from the first UE, a PC5 RRC message that includes the configuration of the one or more sidelink unified TCI state pools.

In an eleventh aspect, alone or in combination with one or more of the first through tenth aspects, process 1000 includes transmitting, to the first UE, sidelink feedback indicating an ACK in connection with receiving the sidelink unified TCI state activation MAC-CE, wherein the set of activated sidelink unified TCI states indicated in the sidelink unified TCI state activation MAC-CE are activated after an application time duration from an end of a slot in which the sidelink feedback indicating the ACK is transmitted.

In a twelfth aspect, alone or in combination with one or more of the first through eleventh aspects, process 1000 includes transmitting, to the first UE, sidelink feedback indicating an ACK in connection with a sidelink communication including the SCI that includes the indication of the at least one sidelink unified TCI state, wherein the at least one sidelink unified TCI state is applied at a start of a first slot after a quantity of symbols from an end of the sidelink feedback indicating the ACK.

In a thirteenth aspect, alone or in combination with one or more of the first through twelfth aspects, the SCI that includes the indication of the at least one sidelink unified TCI state is SCI-2 included in a PSSCH communication, and process 1000 includes transmitting, to the first UE, a PSFCH communication indicating an ACK or a NACK in connection with the PSFCH communication including the SCI-2 that includes the indication of the at least one sidelink unified TCI state, wherein the at least one sidelink unified TCI state is applied at a start of a first slot after a quantity of symbols from an end of the PSFCH communication indicating the ACK or the NACK.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
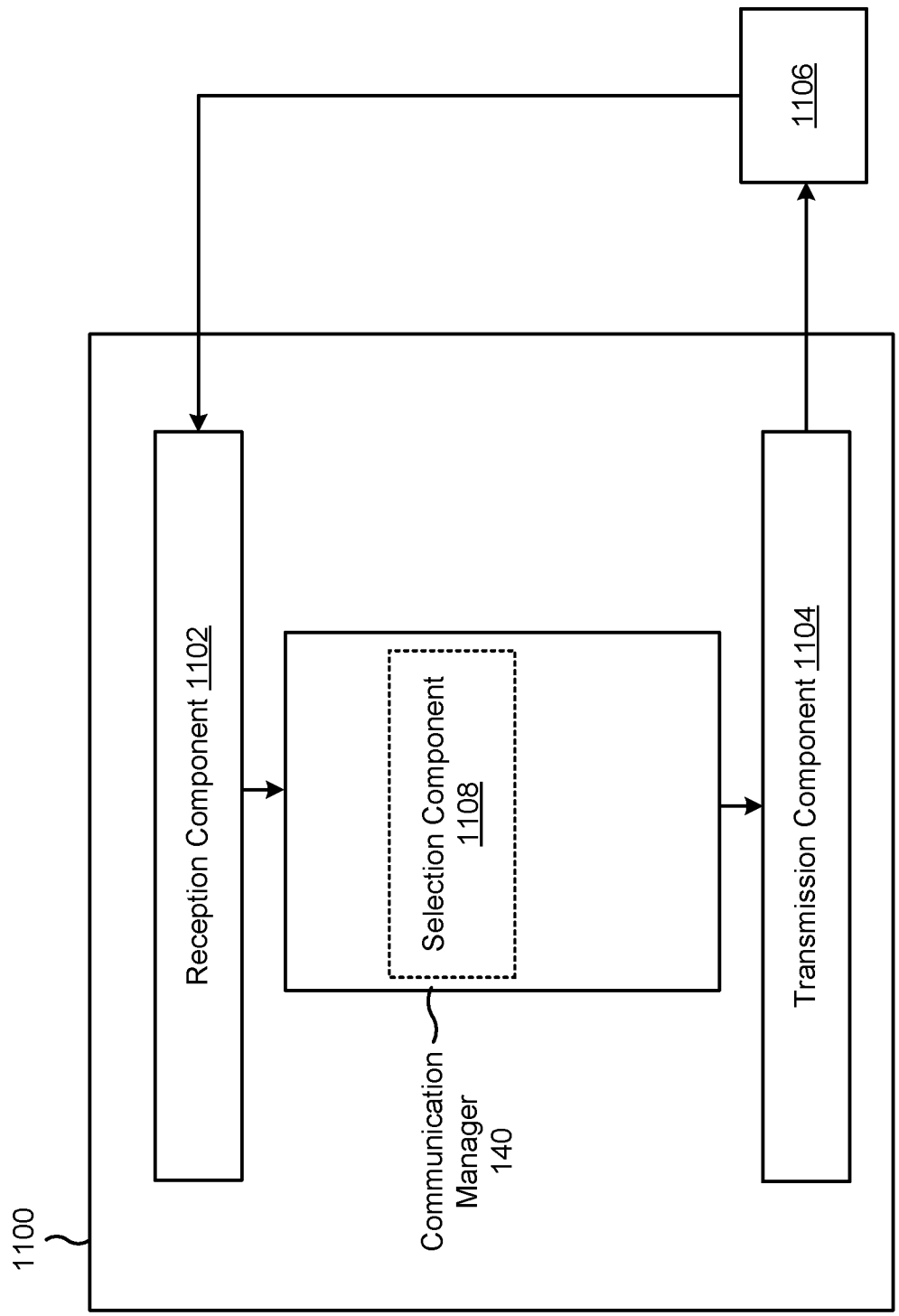
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a selection component 1108, among other examples.

In some aspects, the apparatus 1100 may be configured to perform one or more operations described herein in connection with FIGS. 7A-7D and 8A-8E. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit, to a second UE, an indication of at least one sidelink unified TCI state, wherein the at least one sidelink unified TCI state includes at least one of a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link. The reception component 1102 and/or the transmission component 1104 may communicate with the second UE on at least one of the forward link or the reverse link based at least in part on the indication of the sidelink unified TCI state.

The transmission component 1104 may transmit, to the second UE, a sidelink unified TCI state activation MAC-CE that indicates a set of activated sidelink unified TCI states, wherein the indication, included in the SCI, is an indication of a TCI codepoint that indicates at least one activated sidelink unified TCI state of the set of activated sidelink unified TCI states.

The selection component 1108 may select the set of activated sidelink unified TCI states and/or the at least one sidelink unified TCI state.

The transmission component 1104 may transmit, to the second UE, a configuration of one or more sidelink unified TCI state pools, wherein the set of activated sidelink unified TCI states indicated in the sidelink unified TCI state activation MAC-CE includes activated sidelink unified TCI states of a plurality of sidelink unified TCI states included in the one or more sidelink unified TCI state pools.

The reception component 1102 may receive, from the second UE, sidelink feedback indicating an ACK in connection with transmitting the sidelink unified TCI state activation MAC-CE, wherein the set of activated sidelink unified TCI states indicated in the sidelink unified TCI state activation MAC-CE are activated after an application time duration from an end of a slot in which the sidelink feedback indicating the ACK is received.

The reception component 1102 may receive, from the second UE, sidelink feedback indicating an ACK in connection with a sidelink communication including the SCI that includes the indication of the at least one sidelink unified TCI state, wherein the at least one sidelink unified TCI state is applied at a start of a first slot after a quantity of symbols from an end of the sidelink feedback indicating the ACK.

The reception component 1102 may receive, from the second UE, a physical PSFCH communication indicating an ACK or a NACK in connection with the PSFCH communication including the SCI-2 that includes the indication of the at least one sidelink unified TCI state, wherein the at least one sidelink unified TCI state is applied at a start of a first slot after a quantity of symbols from an end of the PSFCH communication indicating the ACK or the NACK.

The reception component 1102 may receive, from a first UE, an indication of at least one sidelink unified TCI state, wherein the at least one sidelink unified TCI state includes at least one of a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link. The reception component 1102 and/or the transmission component 1104 may communicate with the first UE on at least one of the forward link or the reverse link based at least in part on the indication of the sidelink unified TCI state.

The reception component 1102 may receive, from the first UE, a sidelink unified TCI state activation MAC-CE that indicates a set of activated sidelink unified TCI states, wherein the indication, included in the SCI, is an indication of a TCI codepoint that indicates at least one activated sidelink unified TCI state of the set of activated sidelink unified TCI states.

The reception component 1102 may receive a configuration of one or more sidelink unified TCI state pools, wherein the set of activated sidelink unified TCI states indicated in the sidelink unified TCI state activation MAC-CE includes activated sidelink unified TCI states of a plurality of sidelink unified TCI states included in the one or more sidelink unified TCI state pools.

The transmission component 1104 may transmit, to the first UE, sidelink feedback indicating an ACK in connection with receiving the sidelink unified TCI state activation MAC-CE, wherein the set of activated sidelink unified TCI states indicated in the sidelink unified TCI state activation MAC-CE are activated after an application time duration from an end of a slot in which the sidelink feedback indicating the ACK is transmitted.

The transmission component 1104 may transmit, to the first UE, sidelink feedback indicating an ACK in connection with a sidelink communication including the SCI that includes the indication of the at least one sidelink unified TCI state, wherein the at least one sidelink unified TCI state is applied at a start of a first slot after a quantity of symbols from an end of the sidelink feedback indicating the ACK.

The transmission component 1104 may transmit, to the first UE, a PSFCH communication indicating an ACK or a NACK in connection with the PSFCH communication including the SCI-2 that includes the indication of the at least one sidelink unified TCI state, wherein the at least one sidelink unified TCI state is applied at a start of a first slot after a quantity of symbols from an end of the PSFCH communication indicating the ACK or the NACK.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: transmitting, to a second UE, an indication of at least one sidelink unified transmission configuration indicator (TCI) state, wherein the at least one sidelink unified TCI state includes at least one of: a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link; and communicating with the second UE on at least one of the forward link or the reverse link based at least in part on the indication of the sidelink unified TCI state.

Aspect 2: The method of Aspect 1, wherein the plurality of sidelink channels on the forward link include a physical sidelink control channel (PSCCH) from the first UE to the second UE, a physical sidelink shared channel (PSSCH) from the first UE to the second UE, and a physical sidelink feedback channel (PSFCH) from the first UE to the second UE, and wherein the plurality of sidelink channels on the reverse link include a PSCCH from the second UE to the first UE, a PSSCH from the second UE to the first UE, and a PSFCH from the second UE to the first UE.

Aspect 3: The method of Aspect 1, wherein the plurality of sidelink channels on the forward link include a physical sidelink control channel (PSCCH) from the first UE to the second UE, a physical sidelink shared channel (PSSCH) from the first UE to the second UE, and a physical sidelink feedback channel (PSFCH) from the second UE to the first UE, and wherein the plurality of sidelink channels on the reverse link include a PSCCH from the second UE to the first UE, a PSSCH from the second UE to the first UE, and a PSFCH from the first UE to the second UE.

Aspect 4: The method of any of Aspects 1-3, wherein transmitting the indication of the at least one sidelink unified TCI state comprises: transmitting, to the second UE, sidelink control information (SCI) that includes the indication of the at least one sidelink unified TCI state.

Aspect 5: The method of Aspect 4, further comprising: transmitting, to the second UE, a sidelink unified TCI state activation medium access control (MAC) control element (MAC-CE) that indicates a set of activated sidelink unified TCI states, wherein the indication, included in the SCI, is an indication of a TCI codepoint that indicates at least one activated sidelink unified TCI state of the set of activated sidelink unified TCI states.

Aspect 6: The method of Aspect 5, wherein the sidelink unified TCI state activation MAC-CE includes, for each TCI codepoint value of a set of TCI codepoint values, a respective field that indicates whether that TCI codepoint value indicates a single sidelink unified TCI state or multiple sidelink unified TCI states, and wherein the set of activated sidelink unified TCI states includes, for each TCI codepoint value of the set of TCI codepoint values, one or multiple activated sidelink unified TCI states in accordance with the respective field that indicates whether that TCI codepoint value indicates a single sidelink unified TCI state or multiple sidelink unified TCI states.

Aspect 7: The method of any of Aspects 5-6, further comprising: transmitting, to the second UE, a configuration of one or more sidelink unified TCI state pools, wherein the set of activated sidelink unified TCI states indicated in the sidelink unified TCI state activation MAC-CE includes activated sidelink unified TCI states of a plurality of sidelink unified TCI states included in the one or more sidelink unified TCI state pools.

Aspect 8: The method of Aspect 7, wherein the one or more TCI state pools include a first sidelink unified TCI state pool that includes a plurality of sidelink unified TCI states to be used to indicate joint forward link and reverse link TCI states and separate forward link TCI states, and a second unified TCI state pool that includes a plurality of sidelink unified TCI states to be used to indicate separate reverse link TCI states.

Aspect 9: The method of Aspect 8, wherein the sidelink unified TCI state activation MAC-CE includes, for each activated sidelink unified TCI state of the set of sidelink unified TCI states, a respective TCI state identifier (ID) field that indicates a TCI state ID for that activated sidelink unified TCI state and a respective field that indicates whether the TCI state ID indicated in the respective TCI state ID field maps to the first sidelink unified TCI state pool or the second sidelink unified TCI state pool.

Aspect 10: The method of any of Aspects 7-9, wherein the configuration indicates a sidelink unified TCI state type, and wherein the sidelink unified TCI state type is a joint forward link and reverse link TCI state or a separate forward link and reverse link TCI state.

Aspect 11: The method of any of Aspects 7-10, wherein transmitting the configuration of the one or more sidelink unified TCI state pools comprises: transmitting, to the second UE, a PC5 radio resource control (RRC) message that includes the configuration of the one or more sidelink unified TCI state pools.

Aspect 12: The method of any of Aspects 5-11, further comprising: receiving, from the second UE, sidelink feedback indicating an acknowledgement (ACK) in connection with transmitting the sidelink unified TCI state activation MAC-CE, wherein the set of activated sidelink unified TCI states indicated in the sidelink unified TCI state activation MAC-CE are activated after an application time duration from an end of a slot in which the sidelink feedback indicating the ACK is received.

Aspect 13: The method of any of Aspects 4-12, further comprising: receiving, from the second UE, sidelink feedback indicating an acknowledgement (ACK) in connection with a sidelink communication including the SCI that includes the indication of the at least one sidelink unified TCI state, wherein the at least one sidelink unified TCI state is applied at a start of a first slot after a quantity of symbols from an end of the sidelink feedback indicating the ACK.

Aspect 14: The method of any of Aspects 4-12, wherein the SCI that includes the indication of the at least one sidelink unified TCI state is second stage SCI (SCI-2) included in a physical sidelink shared channel (PSSCH) communication, and further comprising: receiving, from the second UE, a physical sidelink feedback channel (PSFCH) communication indicating an acknowledgement (ACK) or a negative acknowledgement (NACK) in connection with the PSFCH communication including the SCI-2 that includes the indication of the at least one sidelink unified TCI state, wherein the at least one sidelink unified TCI state is applied at a start of a first slot after a quantity of symbols from an end of the PSFCH communication indicating the ACK or the NACK.

Aspect 15: A method of wireless communication performed by a second user equipment (UE), comprising: receiving, from a first UE, an indication of at least one sidelink unified transmission configuration indicator (TCI) state, wherein the at least one sidelink unified TCI state includes at least one of: a joint forward link and reverse link TCI state applicable to a plurality of sidelink channels on a forward link between the first UE and the second UE and a plurality of sidelink channels on a reverse link between the first UE and the second UE, a separate forward link TCI state applicable to the plurality of sidelink channels on the forward link, or a separate reverse link TCI state applicable to the plurality of sidelink channels on the reverse link; and communicating with the first UE on at least one of the forward link or the reverse link based at least in part on the indication of the sidelink unified TCI state.

Aspect 16: The method of Aspect 15, wherein the plurality of sidelink channels on the forward link include a physical sidelink control channel (PSCCH) from the first UE to the second UE, a physical sidelink shared channel (PSSCH) from the first UE to the second UE, and a physical sidelink feedback channel (PSFCH) from the first UE to the second UE, and wherein the plurality of sidelink channels on the reverse link include a PSCCH from the second UE to the first UE, a PSSCH from the second UE to the first UE, and a PSFCH from the second UE to the first UE.

Aspect 17: The method of Aspect 15, wherein the plurality of sidelink channels on the forward link include a physical sidelink control channel (PSCCH) from the first UE to the second UE, a physical sidelink shared channel (PSSCH) from the first UE to the second UE, and a physical sidelink feedback channel (PSFCH) from the second UE to the first UE, and wherein the plurality of sidelink channels on the reverse link include a PSCCH from the second UE to the first UE, a PSSCH from the second UE to the first UE, and a PSFCH from the first UE to the second UE.

Aspect 18: The method of any of Aspects 15-17, wherein receiving the indication of the at least one sidelink unified TCI state comprises: receiving sidelink control information (SCI) that includes the indication of the at least one sidelink unified TCI state.

Aspect 19: The method of Aspect 18, further comprising: receiving, from the first UE, a sidelink unified TCI state activation medium access control (MAC) control element (MAC-CE) that indicates a set of activated sidelink unified TCI states, wherein the indication, included in the SCI, is an indication of a TCI codepoint that indicates at least one activated sidelink unified TCI state of the set of activated sidelink unified TCI states.

Aspect 20: The method of Aspect 19, wherein the sidelink unified TCI state activation MAC-CE includes, for each TCI codepoint value of a set of TCI codepoint values, a respective field that indicates whether that TCI codepoint value indicates a single sidelink unified TCI state or multiple sidelink unified TCI states, and wherein the set of activated sidelink unified TCI states includes, for each TCI codepoint value of the set of TCI codepoint values, one or multiple activated sidelink unified TCI states in accordance with the respective field that indicates whether that TCI codepoint value indicates a single sidelink unified TCI state or multiple sidelink unified TCI states.

Aspect 21: The method of any of Aspects 19-20, further comprising: receiving a configuration of one or more sidelink unified TCI state pools, wherein the set of activated sidelink unified TCI states indicated in the sidelink unified TCI state activation MAC-CE includes activated sidelink unified TCI states of a plurality of sidelink unified TCI states included in the one or more sidelink unified TCI state pools.

Aspect 22: The method of Aspect 21, wherein the one or more TCI state pools include a first sidelink unified TCI state pool that includes a plurality of sidelink unified TCI states to be used to indicate joint forward link and reverse link TCI states and separate forward link TCI states, and a second unified TCI state pool that includes a plurality of sidelink unified TCI states to be used to indicate separate reverse link TCI states.

Aspect 23: The method of Aspect 22, wherein the sidelink unified TCI state activation MAC-CE includes, for each activated sidelink unified TCI state of the set of sidelink unified TCI states, a respective TCI state identifier (ID) field that indicates a TCI state ID for that activated sidelink unified TCI state and a respective field that indicates whether the TCI state ID indicated in the respective TCI state ID field maps to the first sidelink unified TCI state pool or the second sidelink unified TCI state pool.

Aspect 24: The method of any of Aspects 21-23, wherein the configuration indicates a sidelink unified TCI state type, and wherein the sidelink unified TCI state type is a joint forward link and reverse link TCI state or a separate forward link and reverse link TCI state.

Aspect 25: The method of any of Aspects 21-24, wherein receiving the configuration of the one or more sidelink unified TCI state pools comprises: receiving, from the first UE, a PC5 radio resource control (RRC) message that includes the configuration of the one or more sidelink unified TCI state pools.

Aspect 26: The method of any of Aspects 19-25, further comprising: transmitting, to the first UE, sidelink feedback indicating an acknowledgement (ACK) in connection with receiving the sidelink unified TCI state activation MAC-CE, wherein the set of activated sidelink unified TCI states indicated in the sidelink unified TCI state activation MAC-CE are activated after an application time duration from an end of a slot in which the sidelink feedback indicating the ACK is transmitted.

Aspect 27: The method of any of Aspects 18-26, further comprising: transmitting, to the first UE, sidelink feedback indicating an acknowledgement (ACK) in connection with a sidelink communication including the SCI that includes the indication of the at least one sidelink unified TCI state, wherein the at least one sidelink unified TCI state is applied at a start of a first slot after a quantity of symbols from an end of the sidelink feedback indicating the ACK.

Aspect 28: The method of any of Aspects 18-26, wherein the SCI that includes the indication of the at least one sidelink unified TCI state is second stage SCI (SCI-2) included in a physical sidelink shared channel (PSSCH) communication, and further comprising: transmitting, to the first UE, a physical sidelink feedback channel (PSFCH) communication indicating an acknowledgement (ACK) or a negative acknowledgement (NACK) in connection with the PSFCH communication including the SCI-2 that includes the indication of the at least one sidelink unified TCI state, wherein the at least one sidelink unified TCI state is applied at a start of a first slot after a quantity of symbols from an end of the PSFCH communication indicating the ACK or the NACK.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors, coupled to the one or more memories, configured to:
      transmit, to a second UE, an indication of a sidelink unified transmission configuration indicator (TCI) state that is applicable to a plurality of sidelink communications on a plurality of sidelink channels between the first UE and the second UE, wherein the sidelink unified TCI state includes at least one of:
         a joint forward link and reverse link TCI state that is applicable to sidelink communications on sidelink channels on a forward link between the first UE and the second UE and applicable to sidelink communications on sidelink channels on a reverse link between the first UE and the second UE,
         a separate forward link TCI state applicable to the sidelink communications on the sidelink channels on the forward link, or
         a separate reverse link TCI state applicable to the sidelink communications on the sidelink channels on the reverse link; and
      communicate one or more sidelink communications of the plurality of sidelink communications with the second UE on at least one of the forward link or the reverse link based at least in part on the indication of the sidelink unified TCI state.

2. The first UE of claim 1, wherein the sidelink channels on the forward link include a physical sidelink control channel (PSCCH) from the first UE to the second UE, a physical sidelink shared channel (PSSCH) from the first UE to the second UE, and a physical sidelink feedback channel (PSFCH) from the first UE to the second UE, and wherein the sidelink channels on the reverse link include a PSCCH from the second UE to the first UE, a PSSCH from the second UE to the first UE, and a PSFCH from the second UE to the first UE.

3. The first UE of claim 1, wherein the sidelink channels on the forward link include a physical sidelink control channel (PSCCH) from the first UE to the second UE, a physical sidelink shared channel (PSSCH) from the first UE to the second UE, and a physical sidelink feedback channel (PSFCH) from the second UE to the first UE, and wherein the sidelink channels on the reverse link include a PSCCH from the second UE to the first UE, a PSSCH from the second UE to the first UE, and a PSFCH from the first UE to the second UE.

4. The first UE of claim 1, wherein the one or more processors, to transmit the indication of the sidelink unified TCI state, are configured to:
   transmit, to the second UE, sidelink control information (SCI) that includes the indication of the sidelink unified TCI state.

5. The first UE of claim 4, wherein the one or more processors are further configured to:
   transmit, to the second UE, a sidelink unified TCI state activation medium access control (MAC) control element (MAC-CE) that indicates a set of activated sidelink unified TCI states, wherein the indication, included in the SCI, is an indication of a TCI codepoint that indicates at least one activated sidelink unified TCI state of the set of activated sidelink unified TCI states.

6. The first UE of claim 5, wherein the sidelink unified TCI state activation MAC-CE includes, for each TCI codepoint value of a set of TCI codepoint values, a respective field that indicates whether that TCI codepoint value indicates a single sidelink unified TCI state or multiple sidelink unified TCI states, and wherein the set of activated sidelink unified TCI states includes, for each TCI codepoint value of the set of TCI codepoint values, one or multiple activated sidelink unified TCI states in accordance with the respective field that indicates whether that TCI codepoint value indicates the single sidelink unified TCI state or the multiple sidelink unified TCI states.

7. The first UE of claim 5, wherein the one or more processors are further configured to:
transmit, to the second UE, a configuration of one or more sidelink unified TCI state pools, wherein the set of activated sidelink unified TCI states indicated in the sidelink unified TCI state activation MAC-CE includes activated sidelink unified TCI states of a plurality of sidelink unified TCI states included in the one or more sidelink unified TCI state pools.

8. The first UE of claim 7, wherein the one or more sidelink unified TCI state pools include a first sidelink unified TCI state pool that includes a first set of sidelink unified TCI states to be used to indicate joint forward link and reverse link TCI states and separate forward link TCI states, and a second sidelink unified TCI state pool that includes a second set of sidelink unified TCI states to be used to indicate separate reverse link TCI states.

9. The first UE of claim 8, wherein the sidelink unified TCI state activation MAC-CE includes, for each activated sidelink unified TCI state of the set of sidelink unified TCI states, a respective TCI state identifier (ID) field that indicates a TCI state ID for that activated sidelink unified TCI state and a respective field that indicates whether the TCI state ID indicated in the respective TCI state ID field maps to the first sidelink unified TCI state pool or the second sidelink unified TCI state pool.

10. The first UE of claim 7, wherein the configuration indicates a sidelink unified TCI state type, and wherein the sidelink unified TCI state type is a joint forward link and reverse link TCI state type or a separate forward link and reverse link TCI state type.

11. The first UE of claim 7, wherein the one or more processors, to transmit the configuration of the one or more sidelink unified TCI state pools, are configured to:
transmit, to the second UE, a PC5 radio resource control (RRC) message that includes the configuration of the one or more sidelink unified TCI state pools.

12. The first UE of claim 5, wherein the one or more processors are further configured to:
receive, from the second UE, sidelink feedback indicating an acknowledgement (ACK) in connection with transmitting the sidelink unified TCI state activation MAC-CE, wherein the set of activated sidelink unified TCI states indicated in the sidelink unified TCI state activation MAC-CE are activated after an application time duration from an end of a slot in which the sidelink feedback indicating the ACK is received.

13. The first UE of claim 4, wherein the one or more processors are further configured to:
receive, from the second UE, sidelink feedback indicating an acknowledgement (ACK) in connection with a sidelink communication including the SCI that includes the indication of the sidelink unified TCI state, wherein the sidelink unified TCI state is applied at a start of a first slot after a quantity of symbols from an end of the sidelink feedback indicating the ACK.

14. The first UE of claim 4, wherein the SCI that includes the indication of the sidelink unified TCI state is second stage SCI (SCI-2) included in a physical sidelink shared channel (PSSCH) communication, and wherein the one or more processors are further configured to:
receive, from the second UE, a physical sidelink feedback channel (PSFCH) communication indicating an acknowledgement (ACK) or a negative acknowledgement (NACK) in connection with the PSFCH communication including the SCI-2 that includes the indication of the sidelink unified TCI state, wherein the sidelink unified TCI state is applied at a start of a first slot after a quantity of symbols from an end of the PSFCH communication indicating the ACK or the NACK.

15. A second user equipment (UE) for wireless communication, comprising:
one or more memories; and
one or more processors, coupled to the one or more memories, configured to:
receive, from a first UE, an indication of a sidelink unified transmission configuration indicator (TCI) state that is applicable to a plurality of sidelink communications on a plurality of sidelink channels between the first UE and the second UE, wherein the sidelink unified TCI state includes at least one of:
a joint forward link and reverse link TCI state that is applicable to sidelink communications on sidelink channels on a forward link between the first UE and the second UE and applicable to sidelink communications on sidelink channels on a reverse link between the first UE and the second UE,
a separate forward link TCI state applicable to the sidelink communications on the sidelink channels on the forward link, or
a separate reverse link TCI state applicable to the sidelink communications on the sidelink channels on the reverse link; and
communicate one or more sidelink communications of the plurality of sidelink communications with the first UE on at least one of the forward link or the reverse link based at least in part on the indication of the sidelink unified TCI state.

16. The second UE of claim 15, wherein the sidelink channels on the forward link include a physical sidelink control channel (PSCCH) from the first UE to the second UE, a physical sidelink shared channel (PSSCH) from the first UE to the second UE, and a physical sidelink feedback channel (PSFCH) from the first UE to the second UE, and wherein the sidelink channels on the reverse link include a PSCCH from the second UE to the first UE, a PSSCH from the second UE to the first UE, and a PSFCH from the second UE to the first UE.

17. The second UE of claim 15, wherein the sidelink channels on the forward link include a physical sidelink control channel (PSCCH) from the first UE to the second UE, a physical sidelink shared channel (PSSCH) from the first UE to the second UE, and a physical sidelink feedback channel (PSFCH) from the second UE to the first UE, and wherein the sidelink channels on the reverse link include a PSCCH from the second UE to the first UE, a PSSCH from the second UE to the first UE, and a PSFCH from the first UE to the second UE.

18. The second UE of claim 15, wherein the one or more processors, to receive the indication of the sidelink unified TCI state, are configured to:
receive sidelink control information (SCI) that includes the indication of the sidelink unified TCI state.

19. The second UE of claim 18, wherein the one or more processors are further configured to:
receive, from the first UE, a sidelink unified TCI state activation medium access control (MAC) control element (MAC-CE) that indicates a set of activated sidelink unified TCI states, wherein the indication, included in the SCI, is an indication of a TCI codepoint that indicates at least one activated sidelink unified TCI state of the set of activated sidelink unified TCI states.

20. The second UE of claim 19, wherein the sidelink unified TCI state activation MAC-CE includes, for each TCI codepoint value of a set of TCI codepoint values, a respective field that indicates whether that TCI codepoint value indicates a single sidelink unified TCI state or multiple sidelink unified TCI states, and wherein the set of activated sidelink unified TCI states includes, for each TCI codepoint value of the set of TCI codepoint values, one or multiple activated sidelink unified TCI states in accordance with the respective field that indicates whether that TCI codepoint value indicates the single sidelink unified TCI state or the multiple sidelink unified TCI states.

21. The second UE of claim 19, wherein the one or more processors are further configured to:
receive a configuration of one or more sidelink unified TCI state pools, wherein the set of activated sidelink unified TCI states indicated in the sidelink unified TCI state activation MAC-CE includes activated sidelink unified TCI states of a plurality of sidelink unified TCI states included in the one or more sidelink unified TCI state pools.

22. The second UE of claim 21, wherein the one or more sidelink unified TCI state pools include a first sidelink unified TCI state pool that includes a first set of sidelink unified TCI states to be used to indicate joint forward link and reverse link TCI states and separate forward link TCI states, and a second sidelink unified TCI state pool that includes a second set of sidelink unified TCI states to be used to indicate separate reverse link TCI states.

23. The second UE of claim 22, wherein the sidelink unified TCI state activation MAC-CE includes, for each activated sidelink unified TCI state of the set of sidelink unified TCI states, a respective TCI state identifier (ID) field that indicates a TCI state ID for that activated sidelink unified TCI state and a respective field that indicates whether the TCI state ID indicated in the respective TCI state ID field maps to the first sidelink unified TCI state pool or the second sidelink unified TCI state pool.

24. The second UE of claim 21, wherein the configuration indicates a sidelink unified TCI state type, and wherein the sidelink unified TCI state type is a joint forward link and reverse link TCI state type or a separate forward link and reverse link TCI state type.

25. The second UE of claim 21, wherein the one or more processors, to receive the configuration of the one or more sidelink unified TCI state pools, are configured to:
receive, from the first UE, a PC5 radio resource control (RRC) message that includes the configuration of the one or more sidelink unified TCI state pools.

26. The second UE of claim 19, wherein the one or more processors are further configured to:
transmit, to the first UE, sidelink feedback indicating an acknowledgement (ACK) in connection with receiving the sidelink unified TCI state activation MAC-CE, wherein the set of activated sidelink unified TCI states indicated in the sidelink unified TCI state activation MAC-CE are activated after an application time duration from an end of a slot in which the sidelink feedback indicating the ACK is transmitted.

27. The second UE of claim 18, wherein the one or more processors are further configured to:
transmit, to the first UE, sidelink feedback indicating an acknowledgement (ACK) in connection with a sidelink communication including the SCI that includes the indication of the sidelink unified TCI state, wherein the sidelink unified TCI state is applied at a start of a first slot after a quantity of symbols from an end of the sidelink feedback indicating the ACK.

28. The second UE of claim 18, wherein the SCI that includes the indication of the sidelink unified TCI state is second stage SCI (SCI-2) included in a physical sidelink shared channel (PSSCH) communication, and wherein the one or more processors are further configured to:
transmit, to the first UE, a physical sidelink feedback channel (PSFCH) communication indicating an acknowledgement (ACK) or a negative acknowledgement (NACK) in connection with the PSFCH communication including the SCI-2 that includes the indication of the sidelink unified TCI state, wherein the sidelink unified TCI state is applied at a start of a first slot after a quantity of symbols from an end of the PSFCH communication indicating the ACK or the NACK.

29. A method of wireless communication performed by a first user equipment (UE), comprising:
transmitting, to a second UE, an indication of a sidelink unified transmission configuration indicator (TCI) state that is applicable to a plurality of sidelink communications on a plurality of sidelink channels between the first UE and the second UE, wherein the sidelink unified TCI state includes at least one of:
a joint forward link and reverse link TCI state that is applicable to sidelink communications on sidelink channels on a forward link between the first UE and the second UE and applicable to sidelink communications on sidelink channels on a reverse link between the first UE and the second UE,
a separate forward link TCI state applicable to the sidelink communications on the sidelink channels on the forward link, or
a separate reverse link TCI state applicable to the sidelink communications on the sidelink channels on the reverse link; and
communicating one or more sidelink communications of the plurality of sidelink communications with the second UE on at least one of the forward link or the reverse link based at least in part on the indication of the sidelink unified TCI state.

30. A method of wireless communication performed by a second user equipment (UE), comprising:
receiving, from a first UE, an indication of a sidelink unified transmission configuration indicator (TCI) state that is applicable to a plurality of sidelink communications on a plurality of sidelink channels between the first UE and the second UE, wherein the sidelink unified TCI state includes at least one of:
a joint forward link and reverse link TCI state that is applicable to sidelink communications on sidelink channels on a forward link between the first UE and the second UE and applicable to sidelink communications on sidelink channels on a reverse link between the first UE and the second UE, a separate forward link TCI state applicable to the sidelink communications on the sidelink channels on the forward link, or a separate reverse link TCI state applicable to the sidelink communications on the sidelink channels on the reverse link; and communicating one or more sidelink communications of the plurality of sidelink communications with the first UE on at least one of the forward link or the reverse link based at least in part on the indication of the sidelink unified TCI state.

\* \* \* \* \*